US011098191B2

(12) United States Patent
Blanchard et al.

(10) Patent No.: US 11,098,191 B2
(45) Date of Patent: Aug. 24, 2021

(54) POLYMER COMPOSITION FILLED WITH AN INORGANIC FILLER MATERIAL MIXTURE

(71) Applicant: Omya International AG, Oftringen (CH)

(72) Inventors: Pierre Blanchard, Reyrieux (FR); Tazio Fornera, Zofingen (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 15/314,649

(22) PCT Filed: Jun. 2, 2015

(86) PCT No.: PCT/EP2015/062221
§ 371 (c)(1),
(2) Date: Nov. 29, 2016

(87) PCT Pub. No.: WO2015/185533
PCT Pub. Date: Dec. 10, 2015

(65) Prior Publication Data
US 2017/0198137 A1 Jul. 13, 2017

(30) Foreign Application Priority Data
Jun. 5, 2014 (EP) ..................................... 14171275

(51) Int. Cl.
C08L 101/16 (2006.01)
C08L 23/06 (2006.01)
C08L 23/12 (2006.01)
C08K 3/26 (2006.01)
C08L 67/04 (2006.01)
C08L 67/02 (2006.01)
C08K 3/34 (2006.01)
C08K 3/01 (2018.01)
C08K 3/22 (2006.01)
C08J 3/22 (2006.01)

(52) U.S. Cl.
CPC ................ C08L 67/04 (2013.01); C08J 3/22 (2013.01); C08K 3/01 (2018.01); C08K 3/22 (2013.01); C08K 3/26 (2013.01); C08K 3/34 (2013.01); C08L 23/06 (2013.01); C08L 23/12 (2013.01); C08L 67/02 (2013.01); C08L 101/16 (2013.01); C08J 2367/04 (2013.01); C08J 2423/06 (2013.01); C08J 2423/12 (2013.01); C08L 2201/06 (2013.01); C08L 2201/08 (2013.01); C08L 2310/00 (2013.01)

(58) Field of Classification Search
CPC .......... C08L 67/02; C08L 67/04; C08L 23/06; C08L 23/12; C08L 2201/06; C08L 101/16; C08K 3/26; C08K 2003/265; C08J 2367/04; C08J 2423/06; C08J 2423/12
See application file for complete search history.

(56) References Cited

U.S. PATENT DOCUMENTS

| 7,241,850 | B2 * | 7/2007 | Burmaster | C08K 5/0008 |
| | | | | 526/160 |
| 2002/0094444 | A1 * | 7/2002 | Nakata | B32B 27/36 |
| | | | | 428/480 |
| 2005/0203208 | A1 * | 9/2005 | Ruiz | C08K 3/346 |
| | | | | 523/124 |
| 2008/0308010 | A1 | 12/2008 | Rainer et al. | |
| 2010/0068484 | A1 * | 3/2010 | Kaufman | B32B 27/20 |
| | | | | 428/212 |
| 2012/0288650 | A1 | 11/2012 | Freese et al. | |
| 2013/0101774 | A1 * | 4/2013 | MacLeod | C08L 23/06 |
| | | | | 428/36.92 |

(Continued)

FOREIGN PATENT DOCUMENTS

| EP | 1108728 A1 * | 6/2001 |
| EP | 1254766 A1 | 11/2002 |

(Continued)

OTHER PUBLICATIONS

The International Search Report dated Aug. 3, 2015 for PCT/EP2015/062221.
The Written Opinion of International Searching Authority dated Aug. 3, 2015 for PCT/EP2015/062221.
JP 2007223201 A (Sep. 6, 2007)—English-language abstract from Espacenet, 1 page.
RU 2352597 C1 (Apr. 20, 2009)—English-language abstract from Espacenet, 1 page.
Abdolmohammadi et al. (2012) "Enhancement of Mechanical and Thermal Properties of Polycaprolactone/Chitosan Blend by Calcium Carbonate Nanoparticles" Int. J. Mol. Sci., vol. 13, pp. 4508-4522.

(Continued)

Primary Examiner — Karuna P Reddy
(74) Attorney, Agent, or Firm — ALGM LLP; Harry J. Guttman

(57) ABSTRACT

The present invention relates to a polymer composition comprising at least 20.0 wt.-%, based on the total weight of the polymer composition, of at least one biodegradable polymer resin, from 0.1 to 20.0 wt.-%, based on the total weight of the polymer composition, of at least one polyolefin selected from polyethylene and/or polypropylene and from 5.9 to 60.0 wt.-%, based on the total weight of the polymer composition, of an inorganic filler material dispersed in the at least one polyolefin and the at least one biodegradable polymer resin, a process for the preparation of such a polymer composition, the use of an inorganic filler material for increasing the thermal stability and/or processability of a polymer composition, the use of the polymer composition for the preparation of an article as well as in a process selected from extrusion process, co-extrusion process, blown film extrusion process, cast film extrusion or sheet extrusion process, extrusion coating process, injection molding process, blow molding process, thermoforming process as well as an article comprising the polymer composition.

27 Claims, No Drawings

(56) References Cited

U.S. PATENT DOCUMENTS

| | | | |
|---|---|---|---|
| 2014/0066565 A1 | 3/2014 | Jeong et al. | |
| 2014/0134363 A1* | 5/2014 | Yang | C08L 67/02 428/35.5 |
| 2014/0134380 A1* | 5/2014 | Yoon | C08L 23/02 428/68 |
| 2014/0272357 A1* | 9/2014 | He | C08L 23/0846 428/219 |
| 2015/0307671 A1 | 10/2015 | Yang et al. | |

FOREIGN PATENT DOCUMENTS

| | | |
|---|---|---|
| EP | 2213580 A1 | 8/2010 |
| EP | 2554358 A1 | 2/2013 |
| FR | 2941702 A1 | 8/2010 |
| JP | 2001078914 A | 3/2001 |
| JP | 2007-223201 A | 9/2007 |
| KR | WO2013028008 A2 * | 2/2013 |
| RU | 2352597 C1 | 4/2009 |
| RU | 2438979 C2 | 1/2012 |
| WO | 92/04413 A1 | 3/1992 |
| WO | 2002059200 A1 | 8/2002 |
| WO | 2009152427 A1 | 12/2009 |
| WO | 2010001268 A2 | 1/2010 |
| WO | 2012018327 A1 | 2/2012 |
| WO | 2012094758 A1 | 7/2012 |
| WO | 2013/017895 A1 | 2/2013 |
| WO | 2013/120934 A1 | 8/2013 |
| WO | 2013190274 A2 | 12/2013 |
| WO | 2014/029692 A2 | 2/2014 |
| WO | 2014075997 A1 | 5/2014 |

OTHER PUBLICATIONS

Kamal et al. (2012) "Calcium carbonate (CaCO3) nanoparticle filled polypropylene: Effect of particle surface treatment on mechanical, thermal, and morphological performance of composites" J. Appl. Polym. Sci., vol. 124, pp. 2649-2656.

Nekhamanurak et al. (2012) "Mechanical Properties of Hydrophilicity Modified CaCO3-Poly (Lactic Acid) Nanocomposite" International Journal of Applied Physics and Mathematics, vol. 2, No. 2, pp. 98-103.

Yue et al.(2013) "Influence of Composite Modifier on the Modification of Calcium Carbonate Powder." Advanced Materials Research, vol. 744, pp. 297-300.

* cited by examiner

POLYMER COMPOSITION FILLED WITH AN INORGANIC FILLER MATERIAL MIXTURE

CROSS-REFERENCE TO RELATED APPLICATIONS

This is a U.S. national phase of PCT Application No. PCT/EP2015/062221, filed Jun. 2, 2015, which claims priority to European Application No. 14171275.2, filed Jun. 5, 2014.

The present invention relates to a polymer composition comprising at least 20.0 wt.-%, based on the total weight of the polymer composition, of at least one biodegradable polymer resin, from 0.1 to 20.0 wt.-%, based on the total weight of the polymer composition, of at least one polyolefin selected from polyethylene and/or polypropylene and from 5.9 to 60.0 wt.-%, based on the total weight of the polymer composition, of an inorganic filler material dispersed in the at least one polyolefin and the at least one biodegradable polymer resin, a process for the preparation of such a polymer composition, the use of an inorganic filler material for increasing the thermal stability and/or processability of a polymer composition, the use of the polymer composition for the preparation of an article as well as in a process selected from extrusion process, co-extrusion process, blown film extrusion process, cast film extrusion or sheet extrusion process, extrusion coating process, injection molding process, blow molding process, thermoforming process as well as an article comprising the polymer composition.

In practice, filler materials and especially calcium carbonate-containing filler materials are often used as particulate fillers in polymer products such as food packaging articles. For instance, the trend in packaging of materials intended for human or animal consumption is moving towards packaging materials made of biodegradable polymers.

Such materials are described in a number of documents. For instance, U.S. Pat. No. 8,008,373 B2 refers to a biodegradable thermoplastic polymer masterbatch composition comprising a blend of at least one biodegradable thermoplastic polymer containing high loading of a particulate filler uniformly dispersed therein. The amount of the biodegradable thermoplastic polymer is generally from about 25% to about 50% by weight and the amount of the filler is from about 75% to about 50% by weight, based upon the total amount of one biodegradable polymer and the at least one filler. The preferred particulate filler is described as being talc.

WO 2013/190274 A2 refers to compositions comprising a biopolymer and a particulate mineral filler. The biopolymer can be polylactic acid, and the particulate mineral filler comprises calcined clay promoting the biodegradabilty of such biopolymers.

WO 2012/094758 A1 refers to a polylactic acid resin composition comprising a chain mobility additive and a mineral filler. Examples of mineral fillers include talc, silica, silicates, calcium carbonate, calcium sulfate, mica, wollastonite, kaolin and combinations thereof.

WO 2012/018327 A1 refers to a polymer composition including a poly(lactic acid), an aliphatic polyester, and an organically coated calcium carbonate.

WO 2010/001268 A2 refers to a biodegradable packaging film, wherein the film includes a blend that comprises: at least one thermoplastic starch in an amount of from about 10 wt. % to about 60 wt. % of the blend, at least one polylactic acid in an amount of from about 1 wt. % to about 30 wt. % of the blend, at least one aliphatic-aromatic copolyester in an amount of from about 20 wt. % to about 70 wt. % of the blend, and at least one filler in an amount of from about 1 wt. % to about 25 wt. % of the blend, wherein the ratio of the total weight percentage of the aliphatic-aromatic copolyester and thermoplastic starch to the total weight percentage of the polylactic acid and filler is from about 1 to about 10.

WO 2009/152427 A1 refers to a biaxially oriented laminate film including a core layer including a blend of crystalline polylactic acid polymer and an inorganic antiblock particle.

EP 1 254 766 A1 refers to multilayer films comprising a layer comprising a thermoplastic polymer, such as an aliphatic-aromatic copolyester (AAPE), with or without filler, and a layer comprising a filled thermoplastic polymer.

EP 1 360 236 B1 refers to a biodegradable mixture obtained by melt mixing polyesters comprising (A) an aliphatic polyester obtained from aliphatic diacids selected from the group consisting of azelaic acid, sebacic acid, brassilic acid, mixtures thereof and mixtures of said acids with aliphatic dicarboxylic acids and/or aliphatic hydroxy-acids containing more than 50 mole % of azelaic acid, sebacic acid and brassilic acid, and from aliphatic diols; (B) a polymer of lactic acid in which the concentration by weight of A with respect to (A+B) is in the range of 30 to 60% and in which the sum of the fusion enthalpy $\Delta H_A$ and $\Delta H_B$ of the two polyesters in the mixture is greater than the sum of the fusion enthalpies $\Delta H_1$ and $\Delta H_2$ of the polyesters prior to melt mixing.

EP 2 554 358 A1 refers to a moisture-permeable and waterproof film that is biodegradable comprising polylactic acid and an inorganic filler. The inorganic filler is selected from the group consisting of calcium carbonate, barium carbonate, calcium sulfate, barium sulfate, magnesium hydroxide, aluminum hydroxide, calcium hydroxide, magnesium oxide, titanium oxide, zinc oxide, silicon oxide and talc.

FR 2 941 702 A1 refers to a polymer composition based on poly lactic acid which comprises poly lactic acid and a mixture of additives promoting the crystallization of polylactic acid, wherein the mixture of additives comprises a mineral filler, a glycol polyether, and an aliphatic amide.

US 2012/0288650 A1 refers to a biodegradable polyester film comprising: i) from 75 to 100% by weight, based on the total weight of components i to ii, of a biodegradable polyester based on aliphatic and/or aromatic dicarboxylic acids and on an aliphatic dihydroxy compound; ii) from 0 to 25% by weight, based on the total weight of components i to ii, of polylactic acid; iii) from 10 to 25% by weight, based on the total weight of components i to v, of calcium carbonate; iv) from 3 to 15% by weight, based on the total weight of components i to v, of talc; v) from 0 to 1% by weight, based on the total weight of components i to v, of a copolymer which contains epoxy groups and is based on styrene, acrylic ester, and/or methacrylic ester; vi) from 0 to 2% by weight, based on the total weight of components i to v, of 2-(4,6-bisbiphenyl-4-yl-1,3,5-triazin-2-yl)-5-(2-ethyl-(n)-hexyloxy)phenol.

WO 2012/094758 A1 refers to a polylactic acid resin composition having elevated impact resistance and/or elevated heat deflection temperature, the composition comprising polylactic acid as a major phase.

A general disadvantage of the polymer compositions based on biodegradable polymer resins is that they are heat sensitive in the presence of moisture and/or alkaline filler materials such as calcium carbonate and thus the preparation of corresponding articles such as packaging articles at higher temperatures is complicated. In particular, it is to be noted that typical processing equipment used in the large scale industry is sometimes difficult to adjust to a stable temperature over a long period of time. Thus, when working temperatures around 200° C. or higher are adjusted, it may happen that the processing temperature rises above the adjusted temperature and thus—in a continuous process—the biodegradable polymer tends to decompose in the presence of the alkaline filler material resulting in a clogging of the equipment and corresponding production downtimes. However, it has not hitherto been possible to provide a satisfactory solution to improve the thermal stability of such polymer compositions and thus to facilitate its industrial processing where high temperatures are required or needed.

Thus, there is still a need in the art for polymer compositions which address the foregoing technical problems and especially allows for improving the thermal stability of a polymer composition based on biodegradable polymer resins and its processability in the presence of moisture and/or alkaline filler materials at high temperatures.

Accordingly, it is an objective of the present invention to provide a polymer composition based on a biodegradable polymer resin, which has an improved thermal stability in the presence of moisture and/or alkaline filler materials. A further objective is to provide a polymer composition which processability is facilitated at high temperatures, preferably at temperatures of above 200° C.

The foregoing and other objectives are solved by the subject-matter as defined herein in claim 1.

Advantageous embodiments of the inventive polymer composition are defined in the corresponding sub-claims.

According to one aspect of the present application a polymer composition is provided, comprising
  a) at least 20.0 wt.-%, based on the total weight of the polymer composition, of at least one biodegradable polymer resin,
  b) from 0.1 to 20.0 wt.-%, based on the total weight of the polymer composition, of at least one polyolefin selected from polyethylene and/or polypropylene, and
  c) from 5.9 to 60.0 wt.-%, based on the total weight of the polymer composition, of an inorganic filler material dispersed in the at least one polyolefin and the at least one biodegradable polymer resin, wherein the inorganic filler material consists of
    i) from 1.0 to 50.0 wt.-%, based on the total weight of the inorganic filler material, of at least one acidic inorganic filler material, and
    ii) from 50.0 to 99.0 wt.-%, based on the total weight of the inorganic filler material, of at least one alkaline inorganic filler material.

The inventors surprisingly found out that according to the present invention, a polymer composition based on a biodegradable polymer resins can be formulated having an improved thermal stability in the presence of moisture and/or alkaline filler materials and that its processability is facilitated or enabled at high temperatures, preferably at temperatures of above 200° C. In particular, this is achieved by providing a polymer composition based on a biodegradable polymer resin comprising a defined polyolefin and an inorganic filler material.

It should be understood that for the purposes of the present invention, the following terms have the following meanings:

For the purpose of the present invention, the term "filler material" in the meaning of the present application refers to filler material-containing particles being water insoluble.

The term "water insoluble" refers to a solubility of the filler material-containing particles in water at 20° C. (±2° C.) of <0.1 wt.-%, based on the total dry weight of the inorganic filler material.

The term "acidic" inorganic filler material refers to the property of the filler material's accessible surface to provide acidic sites when made into an aqueous solution, suspension or dispersion.

The term "alkaline" inorganic filler material, refers to the property of the filler material's accessible surface to provide alkaline sites when made into an aqueous solution, suspension or dispersion.

The term "accessible" surface of a material refers to the part of the material surface which is in contact with the liquid phase of the aqueous solution, suspension, dispersion or reactive molecules.

The term "biodegradable" polymer resin refers to a polymer resin that is capable of being broken down and disposed of with the help bacteria or other living organisms.

The term "polymer resin" in the meaning of the present invention refers to a polymeric material, either solid or liquid, prior to processing it into an article consisting of the polymeric material.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

According to another aspect of the present invention, a process for the preparation of the polymer composition is provided, the process comprises the steps of:
  a) providing at least one biodegradable polymer resin selected from the group comprising polylactic acid, polylactic acid-based polymer, aliphatic polyester such as polyhydroxybutyrate, poly-3-hydroxybutyrate (P3HB), polyhydroxyvalerate, polyhydroxybutyrate-polyhydroxyvalerate copolymer, polyglyconate, poly(dioxanone) and mixtures thereof, preferably polylactic acid, in an amount of at least 20.0 wt.-%, based on the total weight of the polymer composition
  b) providing at least one polyolefin selected from polyethylene and/or polypropylene as defined herein, in an amount from 0.1 to 20.0 wt.-%, based on the total weight of the polymer composition,
  c) providing at least one acidic inorganic filler material, as defined herein, in an amount from 0.059 to 30.0 wt.-%, based on the total weight of the polymer composition,
  d) providing at least one alkaline inorganic filler material, as defined herein, in an amount from 2.95 to 59.4 wt.-%, based on the total weight of the polymer composition,
  e) combining the components of step a), step b), step c) and step d) in any order such that a polymer composition is formed.

According to a further aspect of the present invention, the use of an inorganic filler material as defined herein for increasing the thermal stability and/or processability of a polymer composition is provided. The inorganic filler material consists of a) from 1.0 to 50.0 wt.-%, based on the total weight of the inorganic filler material, of at least one acidic inorganic filler material as defined herein, and
b) from 50.0 to 99.0 wt.-%, based on the total weight of the inorganic filler material, of at least one alkaline inorganic filler material as defined herein.

A further aspect of the present invention refers to the use of the polymer composition as defined herein for the preparation of an article, preferably a packaging article, more preferably a food packaging article such as a bottle, container, cup, food tray and the like. An even further aspect of the present invention refers to an article, preferably a packaging article, more preferably a food packaging article such as a bottle, container, cup, food tray and the like, comprising the polymer composition as defined herein. A still further aspect of the present invention refers to the use of the polymer composition as defined herein in a process selected from an extrusion process, co-extrusion process, blown film extrusion process, cast film extrusion or sheet extrusion process, extrusion coating process, injection molding process, blow molding process, thermoforming process.

According to one embodiment of the present invention, the at least one polymer composition comprises a) from 35.0 to 94.0 wt.-%, based on the total weight of the polymer composition, of the at least one biodegradable polymer resin, b) from 0.1 to 15.0 wt.-%, based on the total weight of the polymer composition, of the at least one polyolefin selected from polyethylene and/or polypropylene, and c) from 5.9 to 50.0 wt.-%, based on the total weight of the polymer composition, of an inorganic filler material dispersed in the at least one polyolefin and the at least one biodegradable polymer resin.

According to another embodiment of the present invention, the at least one biodegradable polymer resin is selected from the group comprising polylactic acid, polylactic acid-based polymer, aliphatic polyester such as polyhydroxybutyrate, poly-3-hydroxybutyrate (P3HB), polyhydroxyvalerate, polyhydroxybutyrate-polyhydroxyvalerate copolymer, poly(3-hydroxybutyrate-co-3-hydroxyvalerate), polyglyconate, poly(dioxanone) and mixtures thereof, preferably the at least one biodegradable polymer resin is selected from polylactic acid, polylactic acid-based polymer and mixtures thereof.

According to yet another embodiment of the present invention, wherein the at least one polyolefin is a polyethylene, preferably the at least one polyolefin is selected from low-density polyethylene, very-low-density polyethylene, linear low-density polyethylene and mixtures thereof, more preferably the at least one polyolefin is a linear low-density polyethylene having a melt flow rate MFR (190° C., 2.16 kg) measured according to ISO 1133 of from 0.5 to 100.0 g/10 min, preferably from 5.0 to 90.0 g/10 min.

According to one embodiment of the present invention, the at least one polyolefin is a polypropylene, preferably an isotactic polypropylene, having a melt flow rate MFR (230° C., 2.16 kg) measured according to ISO 1133 of from 0.5 to 100.0 g/10 min, preferably from 5.0 to 90.0 g/10 min and most preferably from 10.0 to 80.0 g/10 min, and/or a crystallinity percentage of greater than 20%, preferably from 30% to 90%, more preferably from 45% to 85%, based on the total weight of the polypropylene.

According to another embodiment of the present invention, the at least one acidic inorganic filler material and/or the at least one alkaline inorganic filler material has/have a) a weight median particle size $d_{50}$ value in the range from 1.0 µm to 12.0 µm, preferably from 1.0 to 10.0 µm and most preferably from 2.0 to 8.0 µm, and/or b) a specific surface area (BET) of from 0.1 to 15.0 m$^2$/g as measured by the BET nitrogen method.

According to yet another embodiment of the present invention, the at least one acidic inorganic filler material is selected from the group comprising talc, silica, clay and mixtures thereof.

According to one embodiment of the present invention, the at least one alkaline inorganic filler material is selected from at least one calcium carbonate source, magnesium carbonate, magnesium hydroxide and mixtures thereof. It is preferred that the at least one calcium carbonate source a) is selected from ground calcium carbonate (GCC) and/or precipitated calcium carbonate (PCC), preferably the ground calcium carbonate (GCC) is selected from the group comprising marble, chalk, dolomite, limestone and mixtures thereof and/or the at least one precipitated calcium carbonate (PCC) is selected from the group comprising one or more of the aragonitic, vateritic and calcitic mineralogical crystal forms, and/or b) comprises calcium carbonate in an amount of ≥50.0 wt.-%, preferably ≥75.0 wt.-%, more preferably ≥90.0 wt.-%, even more preferably ≥95.0 wt.-%, and most preferably from 97.0 to 99.9 wt.-%, based on the total weight of the at least one calcium carbonate source.

According to another embodiment of the present invention, at least 1% of the accessible surface area of the at least one acidic inorganic filler material and/or the at least one alkaline inorganic filler material is covered by a coating comprising a) at least one aliphatic carboxylic acid having a total amount of carbon atoms from C4 to C24 and/or reaction products thereof, preferably by a coating comprising stearic acid and/or reaction products thereof, and/or b) at least one mono-substituted succinic anhydride consisting of succinic anhydride mono-substituted with a group selected from a linear, branched, aliphatic and cyclic group having a total amount of carbon atoms from C2 to C30 in the substituent and/or reaction products thereof, and/or c) a phosphoric acid ester blend of one or more phosphoric acid mono-ester and and/or reaction products thereof thereof and one or more phosphoric acid di-ester and/or reaction products thereof.

According to yet another embodiment of the present invention, the inorganic filler material consists of 10.0 to 17.5 wt.-%, based on the total weight of the inorganic filler material, of the at least one acidic inorganic filler material, and 82.5 to 90.0 wt.-%, based on the total weight of the inorganic filler material, of the at least one alkaline inorganic filler material.

According to one embodiment of the present invention, the polymer composition further comprises at least one additive selected from the group comprising impact modifiers, lubricants, waxes, stabilizers, processing aids, pigments, coloring agents and mixtures thereof.

As set out above, the inventive polymer composition comprises at least one biodegradable polymer resin, at least one polyolefin and an inorganic filler material comprising at least one acidic inorganic filler material and at least one alkaline inorganic filler material as set out in points a), b) and c). In the following, it is referred to further details of the present invention and especially the foregoing points of the inventive polymer composition.

According to point a) of the present invention, the polymer composition comprises at least one biodegradable polymer resin. The polymer resin represents the backbone of the composition and provides strength, flexibility, toughness and durability to the final article.

The expression "at least one" biodegradable polymer resin means that one or more kinds of biodegradable polymer resin may be present in the inventive polymer composition.

Accordingly, the at least one biodegradable polymer resin may be one kind of a biodegradable polymer resin. Alternatively, the at least one biodegradable polymer resin may be a mixture of two or more kinds of biodegradable polymer resins. For example, the at least one biodegradable polymer resin may be a mixture of two or three kinds of biodegradable polymer resins. Preferably, the at least one biodegradable polymer resin is one kind of a biodegradable polymer resin.

It is appreciated that the at least one biodegradable polymer resin according to the present invention is not restricted to a specific resin material as long as the polymer composition is suitable for the preparation of articles suitable for goods intended for consumption by animals or humans.

In one embodiment of the present invention, the at least one biodegradable polymer resin has a melting temperature $T_m$ of above 100° C., more preferably of above 150° C.

For example, the melting temperature of the at least one biodegradable polymer resin ranges from 100 to 200° C., more preferably ranges from 140 to 170° C.

Furthermore, it is appreciated that the at least one biodegradable polymer resin may be selected from polymer resins having a broad spectrum of melt flow rate. In general, it is preferred that the at least one biodegradable polymer resin has a melt flow rate MFR (210° C., 2.16 kg) measured according to ISO 1133 of from 1.0 to 120.0 g/10 min, preferably of from 2.0 to 100.0 g/10 min. For example, the at least one biodegradable polymer resin has a melt flow rate MFR (210° C., 2.16 kg) measured according to ISO 1133 of from 2.1 to 40.0 g/10 min or from 2.3 to 35.0 g/10 min.

In one embodiment of the present invention, the at least one biodegradable polymer resin is at least one biodegradable polymer resin selected from the group comprising polylactic acid, polylactic acid-based polymer, aliphatic polyester such as polyhydroxybutyrate, poly-3-hydroxybutyrate (P3HB) polyhydroxyvalerate, polyhydroxybutyrate-polyhydroxyvalerate copolymer, poly(3-hydroxybutyrate-co-3-hydroxyvalerate), polyglyconate, poly(dioxanone) and mixtures thereof.

Preferably, the at least one biodegradable polymer resin is polylactic acid, polylactic acid-based polymer and mixtures thereof.

In one embodiment of the present invention, the at least one biodegradable polymer resin is polylactic acid.

The polylactic acid may be prepared in a well known manner and is commercially available from different manufacturers such as Cereplast Inc, Mitsui Chemicals Inc, Gehr GmbH and many more under the CAS No 9051-89-2.

There is no specific limitation on the molecular weight of the polylactic acid used in this invention. However, the weight average molecular weight of the polylactic acid is preferably in the range of 50 000 to 400 000 g/mol, preferably in the range of 50 000 to 300 000 g/mol and most preferably in the range of 50 000 to 250 000 g/mol. If the weight average molecular weight is smaller than the aforementioned range, the mechanical strength (tensile strength, impact strength) of the polymer composition is too low. On the other hand, if the weight average molecular weight is larger than the aforementioned range, the melt viscosity may be too high for carrying out the processing.

Additionally or alternatively, the polylactic acid has a melt flow rate MFR (210° C., 2.16 kg) measured according to ISO 1133 of from 2.0 to 100.0 g/10 min, preferably of from 2.3 to 35.0 g/10 min and most preferably from 2.3 to 15.0 g/10 min.

Examples of polylactic acid-based resins suitable for the instant polymer composition include copolymers of lactic acid and blends of polylactic acids.

If the polylactic acid-based resin is a copolymer, the polylactic acid-based resin may comprise further copolymer components in addition to lactic acid. Examples of the further copolymer component include hydroxybutyric acid, 3-hydroxybutyric acid, hydroxyvaleric acid, 3-hydroxyvaleric acid and citric acid.

The weight average molecular weight of the polylactic acid-based resin is preferably in the range of 50 000 to 400 000 g/mol, preferably in the range of 50 000 to 300 000 g/mol and most preferably in the range of 50 000 to 250 000 g/mol. Additionally or alternatively, the polylactic acid-based resin has a melt flow rate MFR (210° C., 2.16 kg) measured according to ISO 1133 of from 2.0 to 50.0 g/10 min, preferably of from 2.3 to 35.0 g/10 min and most preferably from 2.5 to 15.0 g/10 min.

In one embodiment of the present invention, the at least one biodegradable polymer resin is an aliphatic polyester.

For example, the aliphatic polyester is selected from polyhydroxybutyrate, poly-3-hydroxybutyrate (P3HB), polyhydroxyvalerate, polyhydroxybutyrate-polyhydroxyvalerate copolymer, poly(3-hydroxybutyrate-co-3-hydroxyvalerate), and mixtures thereof.

The weight average molecular weight of the aliphatic polyester is preferably in the range of 50 000 to 400 000 g/mol, preferably in the range of 50 000 to 300 000 g/mol and most preferably in the range of 50 000 to 250 000 g/mol. Additionally or alternatively, the aliphatic polyester has a melt flow rate MFR (210° C., 2.16 kg) measured according to ISO 1133 of from 2.0 to 70.0 g/10 min, preferably of from 2.3 to 35.0 g/10 min and most preferably from 2.5 to 15.0 g/10 min.

In one embodiment of the present invention, the at least one biodegradable polymer resin is a polyglyconate, poly(dioxanone) and mixtures thereof.

The weight average molecular weight of the polyglyconate and/or poly(dioxanone) is preferably in the range of 50 000 to 400 000 g/mol, preferably in the range of 50 000 to 300 000 g/mol and most preferably in the range of 50 000 to 250 000 g/mol. Additionally or alternatively, the polyglyconate and/or poly(dioxanone) has a melt flow rate MFR (210° C., 2.16 kg) measured according to ISO 1133 of from 2.0 to 100.0 g/10 min, preferably of from 2.3 to 35.0 g/10 min and most preferably from 2.5 to 15.0 g/10 min.

The instant polymer composition comprises the at least one biodegradable polymer resin in an amount of at least 20.0 wt.-%, i.e. from 20.0 to 94.0 wt.-%, based on the total weight of the polymer composition. Preferably, the polymer composition comprises the at least one biodegradable polymer resin in an amount from 35.0 to 94.0 wt.-%, based on the total weight of the polymer composition. More preferably, the polymer composition comprises the at least one biodegradable polymer resin in an amount from 45.0 to 94.0 wt.-%, based on the total weight of the polymer composition.

Another essential component of the instant polymer composition is at least one polyolefin selected from polyethylene and/or polypropylene. The at least one polyolefin selected from polyethylene and/or polypropylene provides flexibility to the polymer composition and together with the inorganic filler materials contributes to the increase of thermal stability of the polymer composition. Thus, the inorganic filler material in combination with the at least one polyolefin selected from polyethylene and/or polypropylene improves or increases the thermal stability and/or the processability of the polymer composition.

In one embodiment of the present invention, the at least one polyolefin has a melting temperature $T_m$ of above 36° C., more preferably of above 105° C. For example, the melting temperature of the at least one polyolefine ranges from 36 to 200° C., more preferably ranges from 105 to 170° C.

The expression "at least one" polyolefin means that one or more kinds of polyolefin may be present in the inventive polymer composition.

Accordingly, the at least one polyolefin may be one kind of a polyolefin. Alternatively, the at least one polyolefin may be a mixture of two or more kinds of polyolefins. For example, the at least one polyolefin may be a mixture of two or three kinds of polyolefins. Preferably, the at least one polyolefin is one kind of a polyolefin.

It is appreciated that the at least one polyolefin is selected from polyethylene and/or polypropylene.

Accordingly, the at least one polyolefin can be a homopolymer and/or a copolymer of polyethylene and/or polypropylene. For example, the at least one polyolefin is a homopolymer of polyethylene or polypropylene or a copolymer of polyethylene and/or polypropylene. Preferably, the at least one polyolefin is a homopolymer of polyethylene or polypropylene. Alternatively, the at least one polyolefin is a copolymer of polyethylene or polypropylene.

The expression homopolymer of polyethylene used in the present invention relates to polyethylene comprising a polyethylene that consists substantially, i.e. of more than 99.7 wt.-%, still more preferably of at least 99.8 wt.-%, based on the total weight of the polyethylene, of ethylene units. For example, only ethylene units in the homopolymer of polyethylene are detectable.

In case the at least one polyolefin of the polymer composition comprises a copolymer of polyethylene, it is appreciated that the polyethylene contains units derivable from ethylene as major components. Accordingly, the copolymer of polyethylene comprises at least 55.0 wt.-% units derivable from ethylene, more preferably at least 60.0 wt.-% of units derived from ethylene, based on the total weight of the polyethylene. For example, the copolymer of polyethylene comprises 60.0 to 99.5 wt.-%, more preferably 90.0 to 99.0 wt.-%, units derivable from ethylene, based on the total weight of the polyethylene. The comonomers present in such copolymer of polyethylene are $C_3$ to $C_{10}$ α-olefins, preferably 1-propene, 1-butene, 1-hexene, 1-octene and butadiene, most preferably 1-propene.

Additionally or alternatively, the at least one polyolefin is a homopolymer and/or copolymer of polypropylene.

The expression homopolymer of polypropylene as used throughout the instant invention relates to a polypropylene that consists substantially, i.e. of more than 99.0 wt.-%, still more preferably of at least 99.5 wt.-%, like of at least 99.8 wt.-%, based on the total weight of the polypropylene, of propylene units. In a preferred embodiment only propylene units are detectable in the homopolymer of polypropylene.

In case the at least one polyolefin of the polymer composition comprises a copolymer of polypropylene, the polypropylene preferably contains units derivable from propylene as major components. The copolymer of polypropylene preferably comprises, preferably consists of, units derived from propylene and $C_2$ and/or $C_4$ α-olefin. In one embodiment of the present invention, the copolymer of polypropylene comprises, preferably consists of, units derived from propylene and at least one α-olefin selected from ethylene 1-butene and butadiene. For example, the copolymer of polypropylene comprises, preferably consists of, units derived from propylene and ethylene. In one embodiment of the present invention, the units derivable from propylene constitutes the main part of the polypropylene, i.e. at least 60.0 wt.-%, preferably of at least 70.0 wt.-%, more preferably of at least 80.0 wt.-%, still more preferably of from 60.0 to 99.0 wt.-%, yet more preferably of from 70.0 to 99.0 wt.-% and most preferably of from 80 to 99 wt.-%, based on the total weight of the polypropylene. The amount of units derived from $C_2$ and/or $C_4$ α-olefin in the copolymer of polypropylene, is in the range of 1.0 to 40.0 wt.-%, more preferably in the range of 1.0 to 30.0 wt.-% and most preferably in the range of 1.0 to 20.0 wt.-%, based on the total weight of the copolymer of polypropylene.

If the copolymer of polypropylene comprises only units derivable from propylene and ethylene, the amount of ethylene is preferably in the range of 1.0 to 20.0 wt.-%, preferably in the range of 1.0 to 15.0 wt.-% and most preferably in the range of 1.0 to 10.0 wt.-%, based on the total weight of the copolymer of polypropylene. Accordingly, the amount of propylene is preferably in the range of 80.0 to 99.0 wt.-%, preferably in the range of 85.0 to 99.0 wt.-% and most preferably in the range of 90.0 to 99.0 wt.-%, based on the total weight of the copolymer of polypropylene.

In one embodiment of the instant invention, the at least one polyolefin is a homopolymer of polyethylene.

If the at least one polyolefin is a homopolymer and/or copolymer of polyethylene, it is appreciated that the at least one polyolefin has a rather low melt flow rate. Accordingly, it is preferred that the at least one polyolefin which is a homopolymer and/or copolymer of polyethylene has a melt flow rate MFR (190° C., 2.16 kg) measured according to ISO 1133 of from 0.5 to 100.0 g/10 min. For example, the at least one polyolefin which is a homopolymer and/or copolymer of polyethylene has a melt flow rate MFR (190° C., 2.16 kg) measured according to ISO 1133 of 5.0 to 90.0 g/10 min or from 10.0 to 80.0 g/10 min.

If the at least one polyolefin is polyethylene, the at least one polyolefin is preferably a low-density polyethylene (LDPE), very-low-density polyethylene (VLDPE), linear low-density polyethylene (LLDPE) and mixtures thereof. Preferably, the at least one polyolefin is a low-density polyethylene (LDPE), very-low-density polyethylene (VLDPE), and mixtures thereof. More preferably, the at least one polyolefin is a linear low-density polyethylene (LLDPE).

Is appreciated that the polyolefin being a low-density polyethylene (LDPE), very-low-density polyethylene (VLDPE) or linear low-density polyethylene (LLDPE), preferably a low-density polyethylene (LDPE), has a melt flow rate MFR (190° C., 2.16 kg) measured according to ISO 1133 of from 0.5 to 100.0 g/10 min. For example, the polyolefin being a low-density polyethylene (LDPE), very-low-density polyethylene (VLDPE) or linear low-density polyethylene (LLDPE), preferably a low-density polyethylene (LDPE), has a melt flow rate MFR (190° C., 2.16 kg) measured according to ISO 1133 of from 5.0 to 90.0 g/10 min or from 10.0 to 80.0 g/10 min.

If the at least one polyolefin is a homopolymer and/or copolymer of polypropylene, preferably a polypropylene homopolymer.

Preferably, the at least one polyolefin which is a homopolymer and/or copolymer of polypropylene, preferably a polypropylene homopolymer, has a melt flow rate MFR (230° C., 2.16 kg) measured according to ISO 1133 of from 0.5 to 100.0 g/10 min. For example, the at least one polyolefin which is a homopolymer and/or copolymer of polypropylene, preferably a polypropylene homopolymer, has a melt flow rate MFR (230° C., 2.16 kg) measured according to ISO 1133 of from 5.0 to 90.0 g/10 min or from 10.0 to 80.0 g/10 min.

It is appreciated that the at least one polyolefin is preferably an isotactic polypropylene. The term "isotactic polypropylene" in the meaning of the present application means isotactic polypropylenes having a very low percentage, unavoidable and known to a person skilled in the art, of atactic polymer or polymer parts.

Preferably, the at least one polyolefin being an isotactic polypropylene has a rather high melt flow rate. It is preferred that the isotactic polypropylene, preferably the polypropylene homopolymer, has a melt flow rate MFR (230° C., 2.16 kg) measured according to ISO 1133 of from 0.5 to 100.0 g/10 min. For example, the isotactic polypropylene, more preferably the polypropylene homopolymer, has a melt flow rate MFR (230° C., 2.16 kg) measured according to ISO 1133 of from 5.0 to 90.0 g/10 min or from 10.0 to 80.0 g/10 min. Additionally or alternatively, the isotactic polypropylene, preferably the polypropylene homopolymer, has a melt flow rate MFR (190° C., −10 kg-1.05 mm) measured according to the amended standard NF T51-620 of ≥200 g/10 min. For example, the isotactic polypropylene, more preferably the polypropylene homopolymer, has a melt flow rate MFR (190° C., −10 kg-1.05 mm) measured according to the amended standard NF T51-620 of ≥500 g/10 min.

Additionally or alternatively, the isotactic polypropylene, preferably the polypropylene homopolymer, has a crystallinity percentage of greater than 20%, preferably from 30% to 90%, more preferably from 45% to 85%, based on the total weight of the polypropylene.

The crystallinity percentage indicates that the isotactic polypropylene, i.e. the homopolymer and/or copolymer of polypropylene, preferably the polypropylene homopolymer, has a rather high melting temperature. Therefore, the isotactic polypropylene, preferably the polypropylene homopolymer, has preferably a melting temperature $T_m$ of above 150° C. For example, the melting temperature of the isotactic polypropylene, preferably the polypropylene homopolymer, ranges from 140 to 200° C., more preferably ranges from 150 to 170° C.

It is appreciated that the polymer composition comprises the at least one polyolefin in an amount of from 0.1 to 20.0 wt.-%, based on the total weight of the polymer composition. In one embodiment of the present invention, the polymer composition comprises the at least one polyolefin in an amount of from 0.5 to 15.0 wt.-%, based on the total weight of the polymer composition. For example, the polymer composition comprises the at least one polyolefin in an amount of from 1.0 to 10.0 wt.-%, based on the total weight of the polymer composition.

A further essential component of the present polymer composition is an inorganic filler material. It is one requirement of the present invention that the polymer composition comprises the inorganic filler material in an amount of 5.9 to 60.0 wt.-%, based on the total weight of the polymer composition.

In one embodiment of the present invention, the polymer composition comprises the inorganic filler material in an amount of from 5.9 to 50.0 wt.-%, based on the total weight of the polymer composition. For example, the polymer composition comprises the inorganic filler material in an amount of from 10.0 to 40.0 wt.-%, based on the total weight of the polymer composition.

It is thus appreciated that the polymer composition comprises the at least one biodegradable polymer resin in an amount of at least 20.0 wt.-%, the at least one polyolefin selected from polyethylene and/or polypropylene from 0.1 to 20.0 wt.-% and the inorganic filler material from 5.9 to 60.0 wt.-%, based on the total weight of the polymer composition. In one embodiment of the present invention, the polymer composition comprises, preferably consists of the at least one biodegradable polymer resin in an amount from 35.0 to 94.0 wt.-%, the at least one polyolefin selected from polyethylene and/or polypropylene from 0.1 to 15.0 wt.-% and the inorganic filler material from 5.9 to 50.0 wt.-%, based on the total weight of the polymer composition.

It is appreciated that the inorganic filler materials consists of from 1.0 to 50.0 wt.-%, based on the total weight of the inorganic filler material, of at least one acidic inorganic filler material, and from 50.0 to 99.0 wt.-%, based on the total weight of the inorganic filler material, of at least one alkaline inorganic filler material. Preferably, the inorganic filler material consists of 10.0 to 17.5 wt.-%, based on the total weight of the inorganic filler material, of the at least one acidic inorganic filler material, and 82.5 to 90.0 wt.-%, based on the total weight of the inorganic filler material, of the at least one alkaline inorganic filler material. More preferably, the inorganic filler material consists of 10.0 to 15.0 wt.-%, based on the total weight of the inorganic filler material, of the at least one acidic inorganic filler material, and 85.0 to 90.0 wt.-%, based on the total weight of the inorganic filler material, of the at least one alkaline inorganic filler material.

In one embodiment of the present invention, the at least one acidic inorganic filler material and/or the at least one alkaline inorganic filler material has/have a weight median particle size $d_{50}$ value in the range from 1.0 µm to 12.0 µm, preferably from 1.0 to 10.0 µm and most preferably from 2.0 to 8.0 µm. Preferably, the at least one acidic inorganic filler material or the at least one alkaline inorganic filler material has a weight median particle size $d_{50}$ value in the range from 1.0 µm to 12.0 µm, preferably from 1.0 to 10.0 µm and most preferably from 2.0 to 8.0 µm. Alternatively, the at least one acidic inorganic filler material and the at least one alkaline inorganic filler material have a weight median particle size $d_{50}$ value in the range from 1.0 µm to 12.0 µm, preferably from 1.0 to 10.0 µm and most preferably from 2.0 to 8.0 µm.

As used herein and as generally defined in the art, the "$d_{50}$" value is determined based on measurements made by using a Mastersizer 2000 of Malvern Instruments Ltd. (operating instrument software version 1.04 and is defined as the size at which 50% (the median point) of the particle volume or mass is accounted for by particles having a diameter equal to the specified value. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

Additionally or alternatively, the at least one acidic inorganic filler material and/or the at least one alkaline inorganic filler material has/have a specific surface area (BET) of from 0.1 to 15.0 $m^2/g$ as measured by the BET nitrogen method. Preferably, the at least one acidic inorganic filler material or the at least one alkaline inorganic filler material has a specific surface area (BET) of from 0.1 to 15.0 $m^2/g$ as measured by the BET nitrogen method. Alternatively, the at least one acidic inorganic filler material and the at least one alkaline inorganic filler material have a specific surface area (BET) of from 0.1 to 15.0 m$^2$/g as measured by the BET nitrogen method.

The term "specific surface area" (in m$^2$/g) of the mineral filler in the meaning of the present invention is determined using the BET method, which is well known to the skilled man (ISO 9277:1995).

In one embodiment of the present invention, the at least one acidic inorganic filler material or the at least one alkaline inorganic filler material has a weight median particle size $d_{50}$ value in the range from 1.0 μm to 12.0 μm, preferably from 1.0 to 10.0 μm and most preferably from 2.0 to 8.0 μm and a specific surface area (BET) of from 0.1 to 15.0 m$^2$/g as measured by the BET nitrogen method. Alternatively, the at least one acidic inorganic filler material and the at least one alkaline inorganic filler material have a weight median particle size $d_{50}$ value in the range from 1.0 μm to 12.0 μm, preferably from 1.0 to 10.0 μm and most preferably from 2.0 to 8.0 μm and a specific surface area (BET) of from 0.1 to 15.0 m$^2$/g as measured by the BET nitrogen method.

The expression "at least one" acidic inorganic filler material means that the acidic inorganic filler material may consists of one or more kinds of acidic inorganic filler material.

Accordingly, the at least one acidic inorganic filler material may be one kind of an acidic inorganic filler material. Alternatively, the at least one acidic inorganic filler material may be a mixture of two or more kinds of acidic inorganic filler materials. For example, the at least one acidic inorganic filler material may be a mixture of two or three kinds of acidic inorganic filler materials. Preferably, the at least one acidic inorganic filler material is one kind of an acidic inorganic filler material.

For example, the at least one acidic inorganic filler material is selected from the group comprising talc, silica, clay and mixtures thereof. Preferably, the at least one acidic inorganic filler material is talc or silica or clay, most preferably talc.

In one embodiment of the present invention, the at least one acidic inorganic filler material which is selected from talc, silica and clay, is treated with a coupling agent, preferably a polymeric coupling agent. Such coupling agents are well known in the art and are used to attach the acidic inorganic filler material to the at least one biodegradable polymer resin and/or at least one polyolefin. Preferably, such coupling agent is selected from alkylsilanes, vinlysilanes and the like.

If the at least one acidic inorganic filler material is talc, the talc preferably has a weight median particle size $d_{50}$ value in the range from 1.0 μm to 12.0 μm, preferably from 1.0 to 10.0 μm and most preferably from 2.0 to 8.0 μm and/or a specific surface area (BET) of from 0.1 to 15.0 m$^2$/g as measured by the BET nitrogen method. Preferably, the talc has a weight median particle size $d_{50}$ value in the range from 1.0 μm to 12.0 μm, preferably from 1.0 to 10.0 μm and most preferably from 2.0 to 8.0 μm or a specific surface area (BET) of from 0.1 to 15.0 m$^2$/g as measured by the BET nitrogen method. Alternatively, the talc has a weight median particle size $d_{50}$ value in the range from 1.0 μm to 12.0 μm, preferably from 1.0 to 10.0 μm and most preferably from 2.0 to 8.0 μm and a specific surface area (BET) of from 0.1 to 15.0 m$^2$/g as measured by the BET nitrogen method.

The expression "at least one" alkaline inorganic filler material means that the alkaline inorganic filler material may consists of one or more kinds of alkaline inorganic filler material.

Accordingly, the at least one alkaline inorganic filler material may be one kind of an alkaline inorganic filler material. Alternatively, the at least one alkaline inorganic filler material may be a mixture of two or more kinds of alkaline inorganic filler materials. For example, the at least one alkaline inorganic filler material may be a mixture of two or three kinds of alkaline inorganic filler materials. Preferably, the at least one alkaline inorganic filler material is one kind of an alkaline inorganic filler material.

In one embodiment of the present invention, the at least one alkaline inorganic filler material is selected from at least one calcium carbonate source, magnesium carbonate, magnesium hydroxide and mixtures thereof.

For example, the at least one alkaline inorganic filler material is at least one calcium carbonate source or magnesium carbonate or magnesium hydroxide. Preferably, the at least one alkaline inorganic filler material is at least one calcium carbonate source. Alternatively, the at least one alkaline inorganic filler material is magnesium hydroxide or magnesium carbonate, preferably magnesium hydroxide.

The term "at least one" calcium carbonate source in the meaning of the present invention means that the calcium carbonate source comprises, preferably consists of, one or more calcium carbonate sources.

In one embodiment of the present invention, the at least one calcium carbonate source comprises, preferably consists of, one calcium carbonate source. Alternatively, the at least one calcium carbonate source comprises, preferably consists of, two or more calcium carbonate sources. For example, the at least one calcium carbonate source comprises, preferably consists of, two or three calcium carbonate sources.

The term at least one "calcium carbonate source" in the meaning of the present invention refers to a compound that comprises calcium carbonate.

The at least one calcium carbonate source in the meaning of the present invention refers to a material being selected from among (natural) ground calcium carbonate (GCC or NGCC), a precipitated calcium carbonate (PCC) and mixtures thereof.

GCC is understood to be a naturally occurring form of calcium carbonate, mined from sedimentary rocks such as dolomite, limestone or chalk, or from metamorphic marble rocks and processed through a treatment such as dry and/or wet grinding in the presence or absence of processing aids such as alkylated or non-alkylated, esterified or non-esterified polyacrylic acids, methacrylic acids and/or their salts as, or phosphates, dry ethers or hydroxygroup containing compounds such as glycerols, or polyethylenglycols, screening and/or fractionizing in wet and/or dry form, for example by a centrifuge, cyclone or classifier. In one embodiment of the present invention, the GCC is selected from the group comprising marble, chalk, dolomite, limestone and mixtures thereof.

By contrast, calcium carbonate of the PCC type include synthetic calcium carbonate products obtained by carbonation of a slurry of calcium hydroxide, commonly referred to in the art as a slurry of lime or milk of lime when derived from finely divided calcium oxide particles in water or by precipitation out of an ionic salt solution. PCC may be rhombohedral and/or scalenohedral and/or aragonitic; preferred synthetic calcium carbonate or precipitated calcium carbonate comprising aragonitic, vateritic or calcitic mineralogical crystal forms or mixtures thereof.

For example, the at least one calcium carbonate source is preferably (natural) ground calcium carbonate (GCC). More preferably, the at least one calcium carbonate source is GCC being selected from the group comprising marble, chalk, dolomite, limestone and mixtures thereof.

In general, the at least one calcium carbonate source comprises calcium carbonate in an amount of ≥50.0 wt.-%, based on the total weight of the at least one calcium carbonate source.

In one embodiment of the present invention, the at least one calcium carbonate source comprises calcium carbonate in an amount of ≥75.0 wt.-%, based on the total weight of the at least one calcium carbonate source. For example, the at least one calcium carbonate source comprises calcium carbonate in an amount of ≥90.0 wt.-%, preferably in an amount of ≥95.0 wt.-%, based on the total weight of the at least one calcium carbonate source. More preferably, the at least one calcium carbonate source comprises calcium carbonate in an amount from 97.0 to 99.9 wt.-%, based on the total weight of the at least one calcium carbonate source.

If the at least one alkaline inorganic filler material is at least one calcium carbonate source, the at least one calcium carbonate source, preferably ground calcium carbonate (GCC) and/or precipitated calcium carbonate (PCC), preferably has a weight median particle size $d_{50}$ value in the range from 1.0 µm to 12.0 µm, preferably from 1.0 to 10.0 µm and most preferably from 2.0 to 8.0 µm and/or a specific surface area (BET) of from 0.1 to 15.0 m$^2$/g as measured by the BET nitrogen method. Preferably, the at least one calcium carbonate source, preferably ground calcium carbonate (GCC) and/or precipitated calcium carbonate (PCC), has a weight median particle size $d_{50}$ value in the range from 1.0 µm to 12.0 µm, preferably from 1.0 to 10.0 µm and most preferably from 2.0 to 8.0 µm or a specific surface area (BET) of from 0.1 to 15.0 m$^2$/g as measured by the BET nitrogen method. Alternatively, the at least one calcium carbonate source, preferably ground calcium carbonate (GCC) and/or precipitated calcium carbonate (PCC), has a weight median particle size $d_{50}$ value in the range from 1.0 µm to 12.0 µm, preferably from 1.0 to 10.0 µm and most preferably from 2.0 to 8.0 µm and a specific surface area (BET) of from 0.1 to 15.0 m$^2$/g as measured by the BET nitrogen method.

It is appreciated that the at least one acidic inorganic filler material, preferably talc, and/or the at least one alkaline inorganic filler material, preferably ground calcium carbonate (GCC) and/or precipitated calcium carbonate (PCC), may be surface treated. For example, the at least one acidic inorganic filler material, preferably talc, and the at least one alkaline inorganic filler material, preferably ground calcium carbonate (GCC) and/or precipitated calcium carbonate (PCC), are surface treated. Alternatively, the at least one acidic inorganic filler material, preferably talc, or the at least one alkaline inorganic filler material, preferably ground calcium carbonate (GCC) and/or precipitated calcium carbonate (PCC), is surface treated.

If the at least one acidic inorganic filler material, preferably talc, and/or the at least one alkaline inorganic filler material, preferably ground calcium carbonate (GCC) and/or precipitated calcium carbonate (PCC), is/are surface treated, it is appreciated that at least 1% of the accessible surface area of the at least one acidic inorganic filler material and/or the at least one alkaline inorganic filler material is covered by a coating comprising the surface treatment agent.

For example, the at least one acidic inorganic filler material, preferably talc, and/or the at least one alkaline inorganic filler material, preferably ground calcium carbonate (GCC) and/or precipitated calcium carbonate (PCC), can be surface treated with at least one aliphatic, preferably linear or branched, carboxylic acid having a total amount of carbon atoms from C4 to C24. Accordingly, at least 1% of the accessible surface area of the at least one acidic inorganic filler material and/or the at least one alkaline inorganic filler material is covered by a coating comprising at least one aliphatic carboxylic acid having a total amount of carbon atoms from C4 to C24 and/or reaction products thereof.

The term "reaction products" of the aliphatic carboxylic acid in the meaning of the present invention refers to products obtained by contacting the at least one acidic inorganic filler material and/or the at least one alkaline inorganic filler material with the at least one aliphatic carboxylic acid. Said reaction products are formed between at least a part of the applied at least one aliphatic carboxylic acid and reactive molecules located at the surface of the at least one acidic inorganic filler material and/or the at least one alkaline inorganic filler material.

The aliphatic carboxylic acid in the meaning of the present invention may be selected from one or more straight chain, branched chain, saturated, unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic carboxylic acid is selected from saturated unbranched carboxylic acids, that is to say the aliphatic carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic carboxylic acid is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid and mixtures thereof.

For example, the aliphatic carboxylic acid is stearic acid.

Additionally or alternatively, the at least one acidic inorganic filler material, preferably talc, and/or the at least one alkaline inorganic filler material, preferably ground calcium carbonate (GCC) and/or precipitated calcium carbonate (PCC), can be surface treated with at least one mono-substituted succinic anhydride consisting of succinic anhydride mono-substituted with a group selected from a linear, branched, aliphatic and cyclic group having a total amount of carbon atoms from C2 to C30 in the substituent. Accordingly, at least 1% of the accessible surface area of the at least one acidic inorganic filler material and/or the at least one alkaline inorganic filler material is covered by a coating comprising at least one mono-substituted succinic anhydride consisting of succinic anhydride mono-substituted with a group selected from a linear, branched, aliphatic and cyclic group having a total amount of carbon atoms from C2 to C30 in the substituent and/or reaction products thereof.

The term "reaction products" of the mono-substituted succinic anhydride in the meaning of the present invention refers to products obtained by contacting the at least one acidic inorganic filler material and/or the at least one alkaline inorganic filler material with the at least one mono-substituted succinic anhydride. Said reaction products are formed between at least a part of the applied at least one mono-substituted succinic anhydride and reactive molecules located at the surface of the at least one acidic inorganic filler material and/or the at least one alkaline inorganic filler material.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent or a branched alkyl group having a total amount of carbon atoms from C3 to C30, preferably from C3 to C20 and most preferably from C4 to C18 in the substituent.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched alkyl group having a total amount of carbon atoms from C3 to C30, preferably from C3 to C20 and most preferably from C4 to C18 in the substituent.

The term "alkyl" in the meaning of the present invention refers to a linear or branched, saturated organic compound composed of carbon and hydrogen. In other words, "alkyl mono-substituted succinic anhydrides" are composed of linear or branched, saturated hydrocarbon chains containing a pendant succinic anhydride group.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

It is appreciated that e.g. the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that e.g. the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In one embodiment of the present invention, the at least one mono-substituted succinic anhydride consists of succinic anhydride mono-substituted with one group being a linear alkenyl group having a total amount of carbon atoms from C2 to C30, preferably from C3 to C20 and most preferably from C4 to C18 in the substituent or a branched alkenyl group having a total amount of carbon atoms from C3 to C30, preferably from C4 to C20 and most preferably from C4 to C18 in the substituent.

The term "alkenyl" in the meaning of the present invention refers to a linear or branched, unsaturated organic compound composed of carbon and hydrogen. Said organic compound further contains at least one double bond in the substituent, preferably one double bond. In other words, "alkenyl mono-substituted succinic anhydrides" are composed of linear or branched, unsaturated hydrocarbon chains containing a pendant succinic anhydride group. It is appreciated that the term "alkenyl" in the meaning of the present invention includes the cis and trans isomers.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

Accordingly, it is appreciated that e.g. the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the at least one mono-substituted succinic anhydride is one alkenyl mono-substituted succinic anhydride. For example, the one alkenyl mono-substituted succinic anhydride is hexenylsuccinic anhydride. Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenylsuccinic anhydride such as n-octenylsuccinic anhydride.

If the at least one mono-substituted succinic anhydride is one alkenyl mono-substituted succinic anhydride, it is appreciated that the one alkenyl mono-substituted succinic anhydride is present in an amount of ≥95 wt.-% and preferably of ≥96.5 wt.-%, based on the total weight of the at least one mono-substituted succinic anhydride provided in step b).

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

In one embodiment of the present invention, the at least one mono-substituted succinic anhydride is a mixture of two or more kinds of alkenyl mono-substituted succinic anhydrides comprising linear hexadecenyl succinic anhydride(s) and linear octadecenyl succinic anhydride(s). Alternatively, the at least one mono-substituted succinic anhydride is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

It is also appreciated that the at least one mono-substituted succinic anhydride may be a mixture of at least one alkyl mono-substituted succinic anhydrides and at least one alkenyl mono-substituted succinic anhydrides.

If the at least one mono-substituted succinic anhydride is a mixture of at least one alkyl mono-substituted succinic anhydrides and at least one alkenyl mono-substituted succinic anhydrides, it is appreciated that the alkyl substituent of the of at least one alkyl mono-substituted succinic anhydrides and the alkenyl substituent of the of at least one alkenyl mono-substituted succinic anhydrides are preferably the same. For example, the at least one mono-substituted succinic anhydride is a mixture of ethylsuccinic anhydride and ethenylsuccinic anhydride. Alternatively, the at least one mono-substituted succinic anhydride is a mixture of propylsuccinic anhydride and propenylsuccinic anhydride. Alternatively, the at least one mono-substituted succinic anhydride is a mixture of butylsuccinic anhydride and butenylsuccinic anhydride. Alternatively, the at least one mono-substituted succinic anhydride is a mixture of triisobutyl succinic anhydride and triisobutenyl succinic anhydride. Alternatively, the at least one mono-substituted succinic anhydride is a mixture of pentylsuccinic anhydride and pentenylsuccinic anhydride. Alternatively, the at least one mono-substituted succinic anhydride is a mixture of hexylsuccinic anhydride and hexenylsuccinic anhydride. Alternatively, the at least one mono-substituted succinic anhydride is a mixture of heptylsuccinic anhydride and heptenylsuccinic anhydride. Alternatively, the at least one mono-substituted succinic anhydride is a mixture of octylsuccinic anhydride and octenylsuccinic anhydride. Alternatively, the at least one mono-substituted succinic anhydride is a mixture of nonylsuccinic anhydride and nonenylsuccinic anhydride. Alternatively, the at least one mono-substituted succinic anhydride is a mixture of decyl succinic anhydride and decenyl succinic anhydride. Alternatively, the at least one mono-substituted succinic anhydride is a mixture of dodecyl succinic anhydride and dodecenyl succinic anhydride. Alternatively, the at least one mono-substituted succinic anhydride is a mixture of hexadecanyl succinic anhydride and hexadecenyl succinic anhydride. For example, the at least one mono-substituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one mono-substituted succinic anhydride is a mixture of octadecanyl succinic anhydride and octadecenyl succinic anhydride. For example, the at least one mono-substituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one mono-substituted succinic anhydride is a mixture of nonylsuccinic anhydride and nonenylsuccinic anhydride.

If the at least one mono-substituted succinic anhydride is a mixture of at least one alkyl mono-substituted succinic anhydrides and at least one alkenyl mono-substituted succinic anhydrides, the weight ratio between the at least one alkyl mono-substituted succinic anhydride and the at least one alkenyl mono-substituted succinic anhydride is between 90:10 and 10:90 (wt.-%/wt.-%). For example, the weight ratio between the at least one alkyl mono-substituted succinic anhydride and the at least one alkenyl mono-substituted succinic anhydride is between 70:30 and 30:70 (wt.-%/wt.-%) or between 60:40 and 40:60.

Additionally or alternatively, the at least one acidic inorganic filler material, preferably talc, and/or the at least one alkaline inorganic filler material, preferably ground calcium carbonate (GCC) and/or precipitated calcium carbonate (PCC), can be surface treated with at least one a phosphoric acid ester blend. Accordingly, at least 1% of the accessible surface area of the at least one acidic inorganic filler material and/or the at least one alkaline inorganic filler material is covered by a coating comprising a phosphoric acid ester blend of one or more phosphoric acid mono-ester and/or reaction products thereof and one or more phosphoric acid di-ester and/or reaction products thereof.

The term "reaction products" of the phosphoric acid mono-ester and one or more phosphoric acid di-ester in the meaning of the present invention refers to products obtained by contacting the at least one acidic inorganic filler material and/or the at least one alkaline inorganic filler material with the at least one phosphoric acid ester blend. Said reaction products are formed between at least a part of the applied phosphoric acid ester blend and reactive molecules located at the surface of the at least one acidic inorganic filler material and/or the at least one alkaline inorganic filler material.

The term "phosphoric acid mono-ester" in the meaning of the present invention refers to an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

The term "phosphoric acid di-ester" in the meaning of the present invention refers to an o-phosphoric acid molecule di-esterified with two alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid mono-ester means that one or more kinds of phosphoric acid mono-ester may be present in the phosphoric acid ester blend.

Accordingly, it should be noted that the one or more phosphoric acid mono-ester may be one kind of phosphoric acid mono-ester. Alternatively, the one or more phosphoric acid mono-ester may be a mixture of two or more kinds of phosphoric acid mono-ester. For example, the one or more phosphoric acid mono-ester may be a mixture of two or three kinds of phosphoric acid mono-ester, like two kinds of phosphoric acid mono-ester.

In one embodiment of the present invention, the one or more phosphoric acid mono-ester consists of an o-phosphoric acid molecule esterified with one alcohol selected from unsaturated or saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from unsaturated or saturated, branched or linear, aliphatic or aromatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof. In one embodiment of the present invention, the one or more phosphoric acid mono-ester is 2-octyl-1-dodecylphosphoric acid mono-ester.

It is appreciated that the expression "one or more" phosphoric acid di-ester means that one or more kinds of phosphoric acid di-ester may be present in the coating layer of the at least one calcium carbonate-containing material and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from unsaturated or saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from unsaturated or saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different, unsaturated or saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof. In one embodiment of the present invention, the one or more phosphoric acid di-ester is 2-octyl-1-dodecylphosphoric acid di-ester.

In one embodiment of the present invention, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof and the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, at least a part of the surface of the at least one acidic inorganic filler material, preferably talc, and/or the at least one alkaline inorganic filler material, preferably ground calcium carbonate (GCC) and/or precipitated calcium carbonate (PCC), comprises a phosphoric acid ester blend of one phosphoric acid mono-ester and/or reaction products thereof and one phosphoric acid di-ester and/or reaction products thereof. In this case, the one phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester and 2-octyl-1-dodecylphosphoric acid mono-ester, the one phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester and 2-octyl-1-dodecylphosphoric acid di-ester.

The phosphoric acid ester blend comprises the one or more phosphoric acid mono-ester and/or reaction products thereof to the one or more phosphoric acid di-ester and/or reaction products thereof in a specific molar ratio. In particular, the molar ratio of the one or more phosphoric acid mono-ester and/or reaction products thereof to the one or more phosphoric acid di-ester and/or reaction products thereof in the coating layer and/or the phosphoric acid ester blend is from 1:1 to 1:100, preferably from 1:1.1 to 1:60, more preferably from 1:1.1 to 1:40, even more preferably from 1:1.1 to 1:20 and most preferably from 1:1.1 to 1:10.

The wording "molar ratio of the one or more phosphoric acid mono-ester and salty reaction products thereof to the one or more phosphoric acid di-ester and salty reaction products thereof" in the meaning of the present invention refers to the sum of the molecular weight of the phosphoric acid mono-ester molecules and/or the sum of the molecular weight of the phosphoric acid mono-ester molecules in the reaction products thereof to the sum of the molecular weight of the phosphoric acid di-ester molecules and/or the sum of the molecular weight of the phosphoric acid di-ester molecules in the reaction products thereof.

In one embodiment of the present invention, the phosphoric acid ester blend coated on at least a part of the surface of the at least one acidic inorganic filler material, preferably talc, and/or the at least one alkaline inorganic filler material, preferably ground calcium carbonate (GCC) and/or precipitated calcium carbonate (PCC), may further comprise one or more phosphoric acid tri-ester and/or phosphoric acid and/or reaction products thereof.

The term "phosphoric acid tri-ester" in the meaning of the present invention refers to an o-phosphoric acid molecule tri-esterified with three alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid tri-ester means that one or more kinds of phosphoric acid tri-ester may be present on at least a part of the surface of the surface reactive white mineral material-containing particles.

Accordingly, it should be noted that the one or more phosphoric acid tri-ester may be one kind of phosphoric acid tri-ester. Alternatively, the one or more phosphoric acid tri-ester may be a mixture of two or more kinds of phosphoric acid tri-ester. For example, the one or more phosphoric acid tri-ester may be a mixture of two or three kinds of phosphoric acid tri-ester, like two kinds of phosphoric acid tri-ester.

It is preferred that at least 1% of the accessible surface area of the at least one acidic inorganic filler material, preferably talc, and/or the at least one alkaline inorganic filler material, preferably ground calcium carbonate (GCC) and/or precipitated calcium carbonate (PCC), is covered by a coating comprising stearic acid and/or reaction products thereof.

The polymer composition of the present invention may further comprise at least one additive selected from the group comprising impact modifiers, lubricants, waxes, stabilizers, processing aids, pigments, coloring agents and mixtures thereof. According to another aspect of the present invention, a process for preparing the polymer composition as defined above is provided. The process comprising the steps of:
 a) providing at least one biodegradable polymer resin selected from the group comprising polylactic acid, polylactic acid-based polymer, aliphatic polyester such as polyhydroxybutyrate, poly-3-hydroxybutyrate (P3HB), polyhydroxyvalerate, polyhydroxybutyrate-polyhydroxyvalerate copolymer, poly(3-hydroxybutyrate-co-3-hydroxyvalerate), polyglyconate, poly(dioxanone) and mixtures thereof, preferably polylactic acid, in an amount of at least 20.0 wt.-%, based on the total weight of the polymer composition
 b) providing at least one polyolefin selected from polyethylene and/or polypropylene, in an amount from 0.1 to 20.0 wt.-%, based on the total weight of the polymer composition,
 c) providing at least one acidic inorganic filler material in an amount from 0.059 to 30.0 wt.-%, based on the total weight of the polymer composition,
 d) providing at least one alkaline inorganic filler material in an amount from 2.95 to 59.4 wt.-%, based on the total weight of the polymer composition,
 e) combining the components of step a), step b), step c) and step d) in any order such that a polymer composition is formed.

With regard to the definition of the at least one biodegradable polymer resin, at least one polyolefin, at least one acidic inorganic filler material and/or at least one alkaline inorganic filler material and preferred embodiments thereof, reference is made to the statements provided above when discussing the technical details of the polymer composition of the present invention.

The components provided in step a), step b), step c) and step d) can be combined by any conventional means known to the skilled person.

The step of combining the components provided in step a), step b), step c) and step d), preferably takes place under mixing conditions. The skilled man will adapt these mixing conditions and configurations of mixing devices, such as Banburry mixers, twin-screw mixers, co-kneaders or any other devices suitable for this operation, according to his needs. However, the listed devices are not to be considered to be of limiting character.

For example, the components provided in step a), step b), step c) and step d) can be combined by bringing the components in form of a compound or masterbatch into contact.

The term "masterbatch" refers to a composition having a concentration of the respective component that is higher than the concentration of the respective component in the instant polymer composition. That is to say, the masterbatch is further diluted such as to obtain the instant polymer composition.

The term "compound" refers to a composition having a concentration of the respective component that is equal to the concentration of the respective component in the instant polymer composition. That is to say, the compound is not necessarily diluted for obtaining the instant polymer composition.

For example, the at least one polyolefin provided in step b), the at least one acidic inorganic filler material provided in step c) and the at least one alkaline inorganic filler material provided in step d) are combined such as to form a masterbatch.

The masterbatch preferably comprises
a) from 13.0 to 50.0 wt.-%, based on the total weight of the masterbatch, of the at least one polyolefin, and
b) from 50.0 to 87.0 wt.-%, based on the total weight of the masterbatch, of the inorganic filler material dispersed in the at least one polyolefin, wherein the inorganic filler material consists of
    i) from 1.0 to 50.0 wt.-%, based on the total weight of the inorganic filler material, of the at least one acidic inorganic filler material, and
    ii) from 50.0 to 99.0 wt.-%, based on the total weight of the inorganic filler material, of the at least one alkaline inorganic filler material.

The masterbatch may then be combined with the at least one biodegradable polymer resin provided in step a) in a sufficient amount such as to form the instant polymer composition. For example, the masterbatch can be added to the at least one biodegradable polymer resin provided in step a) or vice versa.

Alternatively, a part of the at least one polyolefin provided in step b) and the at least one acidic inorganic filler material provided in step c) are combined such as to form one masterbatch. Furthermore, the residual part of the at least one polyolefin provided in step b) and the at least one alkaline inorganic filler material provided in step d) are combined such as to form a further masterbatch.

The one and further masterbatch may then be combined with the at least one biodegradable polymer resin provided in step a) in a sufficient amount such as to form the instant polymer composition. For example, the one and further masterbatch can be added simultaneously or separately to the at least one biodegradable polymer resin provided in step a) or vice versa.

Alternatively, the at least one polyolefin provided in step b) and the at least one acidic inorganic filler material provided in step c) are combined such as to form one masterbatch. Furthermore, the at least one biodegradable polymer resin provided in step a) and the at least one alkaline inorganic filler material provided in step d) are combined such as to form a further masterbatch. As regards the preparation of this further masterbatch, it is appreciated that the corresponding working conditions such as temperature and shear have to be well adapted in order to avoid a decomposition of the at least one biodegradable polymer resin in the presence of the at least one alkaline inorganic filler material. Thus, the further masterbatch comprising the at least one biodegradable polymer resin and the at least one alkaline inorganic filler material is preferably prepared at a temperature of ≤200° C. at low shear, dependent on the equipment used.

The one and further masterbatch may then be combined such as to form the instant polymer composition. For example, the one masterbatch comprising the at least one polyolefin and the at least one acidic inorganic filler material can be added to the further masterbatch comprising the at least one biodegradable polymer resin and the at least one alkaline inorganic filler material or vice versa.

Alternatively, the at least one polyolefin provided in step b) and the at least one alkaline inorganic filler material provided in step d) are combined such as to form one masterbatch. Furthermore, the at least one biodegradable polymer resin provided in step a) and the at least one acidic inorganic filler material provided in step c) are combined such as to form a further masterbatch.

The one and further masterbatch may then be combined such as to form the instant polymer composition. For example, the one masterbatch comprising the at least one polyolefin and the at least one alkaline inorganic filler material can be added to the further masterbatch comprising the at least one biodegradable polymer resin and the at least one acidic inorganic filler material provided or vice versa.

Alternatively, the at least one biodegradable polymer resin provided in step a) and the at least one acidic inorganic filler material provided in step c) and the at least one alkaline inorganic filler material provided in step d) are combined such as to form a masterbatch.

The masterbatch may then be combined with the at least one polyolefin provided in step b) in a sufficient amount such as to form the instant polymer composition. For example, the masterbatch can be added to the at least one polyolefin provided in step b) or vice versa.

The above combinations are not to be considered of limiting character but rather of enabling character. Within the spirit of the present invention no limitations to combinations are given.

In view of the very good results of the process for preparing the polymer composition, as defined above, a further aspect of the present invention refers to a polymer composition which is obtainable by the process according to the present invention.

The polymer composition according to the present invention has an improved thermal stability, especially at temperatures of above 200° C., preferably at temperatures from 200 to 230° C. and thus the processability is facilitated at high temperatures, such as at temperatures of above 200° C., preferably at temperatures from 200 to 230° C.

It is appreciated that the increase in thermal stability and/or processability is accomplished when the melt flow rate MFR (210° C., 2.16 kg) measured according to ISO 1133 of the instant polymer composition is equal or higher than the melt flow rate MFR (210° C., 2.16 kg) measured according to ISO 1133 of the at least one biodegradable polymer resin present in the polymer composition during extrusion at the same temperature for the same time period.

Preferably, the increase in thermal stability and/or processability is accomplished when the melt flow rate MFR (210° C., 2.16 kg) measured according to ISO 1133 of the instant polymer composition is equal or higher than the melt flow rate MFR (210° C., 2.16 kg) measured according to ISO 1133 of the at least one biodegradable polymer resin present in the polymer composition during extrusion at a temperature of above 200° C. and most preferably at temperatures from 200 to 230° C. for a time period of at least 10 min, more preferably at least 20, even more preferably at least 30 min and most preferably from 10 to 60 min.

Additionally or alternatively, the increase in thermal stability and/or processability is accomplished when the polymer composition has a melt flow rate MFR (210° C., 2.16 kg) measured according to ISO 1133 being constant at a temperature of above 200° C., preferably at temperatures from 200 to 230° C.

For example, the increase in thermal stability and/or processability is accomplished when the polymer composition has a melt flow rate MFR (210° C., 2.16 kg) measured according to ISO 1133 being constant at a temperature of above 200° C., preferably at temperatures from 200 to 230° C. for a time period of at least 10 min, more preferably at least 20, even more preferably at least 30 min and most preferably from 10 to 60 min.

The term "constant" in the meaning of the present invention refers to a melt flow rate MFR (210° C., 2.16 kg) measured according to ISO 1133 which does not decrease at the given temperature and time period by a value of more than 10.0 g/10 min and preferably more than 5.0 g/10 min.

Thus, the present invention refers in a further aspect to the use of an inorganic filler material for increasing the thermal stability and/or processability of a polymer composition, wherein the inorganic filler material consists of
  a) from 1.0 to 50.0 wt.-%, based on the total weight of the inorganic filler material, of at least one acidic inorganic filler material, and
  b) from 50.0 to 99.0 wt.-%, based on the total weight of the inorganic filler material, of at least one alkaline inorganic filler material.

In a further aspect, the present invention refers to the use of a combination of at least one polyolefin selected from polyethylene and/or polypropylene and an inorganic filler material for increasing the thermal stability and/or processability of a polymer composition, wherein the inorganic filler material consists of
  a) from 1.0 to 50.0 wt.-%, based on the total weight of the inorganic filler material, of at least one acidic inorganic filler material, and
  b) from 50.0 to 99.0 wt.-%, based on the total weight of the inorganic filler material, of at least one alkaline inorganic filler material.

With regard to the definition of the polymer composition, at least one polyolefin, at least one acidic inorganic filler material and at least one alkaline inorganic filler material and preferred embodiments thereof, reference is made to the statements provided above when discussing the technical details of the polymer composition of the present invention.

According to one embodiment, the polymer composition of the present invention may be used in the preparation of polymer articles, preferably a packaging article. Thus, in a further aspect, the present invention refers to the use of the polymer composition for the preparation of an article, preferably a packaging article, more preferably a food packaging article such as a bottle, container, cup, food tray and the like. It is appreciated that the polymer composition can be also used for the preparation of a part of an article, preferably a part of a packaging article, more preferably a part of a food packaging article such as a bottle, container, cup, food tray and the like.

With regard to the definition of the polymer composition and preferred embodiments thereof, reference is made to the statements provided above when discussing the technical details of the polymer composition of the present invention.

According to another aspect, the article, preferably the packaging article, more preferably the food packaging article, comprises the instant polymer composition. Thus, it is preferred that at least a part, preferably the complete article, comprises the instant polymer composition. Examples of such article, preferably a packaging article, more preferably a food packaging article, include flexible packaging articles for industrial and consumer applications, including roll stocks, bags, pouches, labels, wraps, lidding, sheets, shrink sleeves and stretch films; rigid packaging articles for industrial and consumer applications including plastic bottles, cups, food tray and containers.

For example, sheets may be prepared by known methods from the instant polymer composition as a mono-sheet or as a multiple-layer sheet, preferably co-extruded multiple-layer sheet, comprising e.g. 2 to 7 layers, preferably 3 or 5 layers, having the same or different composition. However, it is to be noted that at least one layer comprises the instant polymer composition.

For example, if a 3-layer sheet, preferably a co-extruded 3-layer sheet, is prepared, at least one layer, preferably the middle layer and optionally one outer layer, comprises the instant polymer composition and at least one layer, preferably one outer layer or both outer layers, are prepared from the biodegradable polymer resin only; i.e. the one outer layer or both outer layers is/are free of the inorganic filler material consisting of at least one acidic inorganic filler material and at least one alkaline inorganic filler material.

Preferably, if the article is a food packaging article at least the outer layer being in contact with food comprises the biodegradable polymer resin only.

If a 5-layer sheet, preferably a co-extruded 5-layer sheet, is prepared, at least one layer, preferably at least one of the middle layers, comprises the instant polymer composition. The 5-layer sheet can further comprise one or more layers made from polyvinyl alcohol to improve the gas impermeability of the sheet, and/or one or more layers made from polypropylene grafted with maleic anhydride for improving the adhesion of the layers, and/or one or more layers made from polylactic acid or polyethylene or polypropylene filled with $TiO_2$ and/or carbon black for improving the opacity.

The instant polymer composition may be used in any process suitable for preparing such a polymer article known to the skilled person.

In the art, many processes for the preparation of polymer articles are known. These processes include, without being limited to, extrusion processes, co-extrusion process, extrusion coating processes, injection molding processes, blow molding processes and thermoforming processes.

Thus, in a further aspect, the present invention refers to the use of the polymer composition in a process selected from extrusion process, co-extrusion process, blown film extrusion process, cast film extrusion or sheet extrusion process, extrusion coating process, injection molding process, blow molding process, thermoforming process.

The following examples may additionally illustrate the invention but are not meant to restrict the invention to the exemplified embodiments. The examples below show the increased thermal stability and processability of the polymer composition according to the present invention:

EXAMPLES

Measurement Methods
The following measurement methods are used to evaluate the parameters given in the examples and claims.
Particle Size Distribution (Mass % Particles with a Diameter<X) and Weight Median Diameter ($d_{50}$) of a Particulate Material As used herein and as generally defined in the art, the "$d_{50}$" value is determined based on measurements made by using a Mastersizer 2000 of Malvern Instruments Ltd. and is defined as the size at which 50% (the median point) of the particle volume or mass is accounted for by particles having a diameter equal to the specified value.

The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

BET Specific Surface Area of a Material
Throughout the present document, the specific surface area (in $m^2/g$) of the mineral filler is determined using the BET method (using nitrogen as adsorbing gas), which is well known to the skilled man (ISO 9277:1995). The total surface area (in $m^2$) of the mineral filler is then obtained by multiplication of the specific surface area and the mass (in g) of the mineral filler prior to treatment.

MFR

The melt flow rate is measured according to ISO 1133 (190° C., 2.16 kg load), (210° C., 2.16 kg load), (230° C., 2.16 kg load) or according to the amended standard NF T51-620 (190° C., −10 kg-1.05 mm). According to ISO 1133, the melt flow rate MFR is the quantity of polymer and/or copolymer, expressed in grams per 10 minutes which flows at a temperature (190° C., 210° C., 230° C.) chosen in the range delimited by the softening and transformation temperatures under a given standardized load (2.16 kg, 5 kg, 10 kg, 21.6 kg) through a die with a given diameter (2.09 mm to 2.10 mm or 1.05 mm to 1.06 mm) for a measured time. In the present application, ISO 1133 uses a die with a diameter of 2.09 mm, a temperature of 190° C. or 210° C. or 230° C. as indicated and a load of 2.16 kg. Unless otherwise indicated, the melt flow rate of the at least one biodegradable polymer resin is measured according to ISO 1133 (210° C., 2.16 kg load). Unless otherwise indicated, the melt flow rate of the at least one polyolefin which is a homopolymer and/or copolymer of polyethylene is measured according to ISO 1133 (190° C., 2.16 kg load). Unless otherwise indicated, the melt flow rate of the at least one polyolefin which is a homopolymer and/or copolymer of polypropylene is measured according to ISO 1133 (230° C., 2.16 kg load).

Cristallinity

The crystallinity is measured by using a differential calorimetric method referred to as the DSC (Differential Scanning calorimetry) method using a DSC 20 apparatus from the company Mettler-Toledo which makes it possible to measure the fusion energy of each polymer and to determine the index. For example, for polypropylene the index is determined by comparison with the value of 138 J/g, which corresponds to an index of 100%.

EXAMPLES

These examples which are not limitative, describe the thermal stability and processability of the instant polymer compositions during the extrusion of sheets. The temperature was set to a temperature of 230° C. (die temperature). The shear depending on the screw profile and screw speed was kept constant from one example to another one. The decomposition of the polymer composition leads to a liquid material which is thus indicative for the thermal stability of the polymer composition. This decomposition was observed on the extruder by a decrease of the pressure behind the die. Thus, it can be noted that the higher the pressure the lower is the polymer decomposition and thus results in an improved thermal stability.

Thus, the thermal stability and processability are evaluated with regard to the pressure behind the die and the product obtained after extrusion, i.e. the melt coming out from the die.

The sheet composition was elaborated directly into the extruder with different raw materials which could be resin, masterbatches or compounds.

Reference Test 1
Composition of the Sheet Produced:
100 wt.-% polylactic acid having a MFR of 5.4 g/10 min (210° C./2.16 kg) measured according to ISO 1133.

Comparative Test 2
Composition of the Sheet Produced:
75 wt.-%, based on the total weight of the composition, of polylactic acid having a MFR of 5.4 g/10 min (210° C./2.16 kg) measured according to ISO 1133 and 25 wt.-%, based on the total weight of the composition, of a masterbatch. The masterbatch comprising 80 wt.-%, based on the total weight of the masterbatch, of marble comprising 97.5 wt.-%, based on the total weight of marble, of calcium carbonate and 2 wt.-%, based on the total weight of marble, of magnesium carbonate. The marble had a $d_{50}$ of 5.5 µm and a $d_{98}$ of 30 µm. The masterbatch further contained 20 wt.-%, based on the total weight of the masterbatch, of a linear low density polyethylene having a MFR of 20 g/10 min (190° C./2.16 kg) measured according to ISO 1133.

Inventive Test 3
Composition of the Sheet Produced:
75 wt.-%, based on the total weight of the composition, of polylactic acid having a MFR of 5.4 g/10 min (210° C./2.16 kg) measured according to ISO 1133 and 25 wt.-%, based on the total weight of the composition, of a masterbatch. The masterbatch comprising 70 wt.-%, based on the total weight of the masterbatch, of marble comprising 97.5 wt.-%, based on the total weight of marble, of calcium carbonate and 2 wt.-%, based on the total weight of marble, of magnesium carbonate. The marble had a $d_{50}$ of 5.5 µm and a $d_{98}$ of 30 µm. The masterbatch contained also 10 wt.-%, based on the total weight of the masterbatch, of talc (commercially available as Finntalc M20SL from Mondo Minerals, Finland) and 20 wt.-%, based on the total weight of the masterbatch, of a linear low density polyethylene having a MFR of 20 g/10 min (190° C./2.16 kg) measured according to ISO 1133.

Comparative Test 4
Composition of the Sheet Produced:
50 wt.-%, based on the total weight of the composition, of polylactic acid having a MFR of 5.4 g/10 min (210° C./2.16 kg) measured according to ISO 1133 and 50 wt.-%, based on the total weight of the composition, of a masterbatch. The masterbatch comprising 80 wt.-%, based on the total weight of the masterbatch, of marble comprising 97.5 wt.-%, based on the total weight of marble, of calcium carbonate and 2 wt.-%, based on the total weight of marble, of magnesium carbonate. The marble had a $d_{50}$ of 5.5 µm and a $d_{98}$ of 30 µm. The masterbatch further contained 20 wt.-%, based on the total weight of the masterbatch, of a linear low density polyethylene having a MFR of 20 g/10 min (190° C./2.16 kg) measured according to ISO 1133.

Inventive Test 5
Composition of the Sheet Produced:
50 wt.-%, based on the total weight of the composition, of polylactic acid having a MFR of 5.4 g/10 min (210° C./2.16 kg) measured according to ISO 1133 and 50 wt.-%, based on the total weight of the composition, of a masterbatch. The masterbatch comprising 70 wt.-%, based on the total weight of the masterbatch, of marble comprising 97.5 wt.-%, based on the total weight of marble, of calcium carbonate and 2 wt.-%, based on the total weight of marble, of magnesium carbonate. The marble had a $d_{50}$ of 5.5 µm and a $d_{98}$ of 30 µm. The masterbatch contained also 10 wt.-%, based on the total weight of the masterbatch, of talc (commercially available as Finntalc M20SL from Mondo Minerals, Finland) and 20 wt.-%, based on the total weight of the masterbatch, of a linear low density polyethylene having a MFR of 20 g/10 min (190° C./2.16 kg) measured according to ISO 1133.

Comparative Test 6
Composition of the Sheet Produced:
73 wt.-%, based on the total weight of the composition, of polylactic acid having a MFR of 5.4 g/10 min (210° C./2.16 kg) measured according to ISO 1133 and 27 wt.-%, based on the total weight of the composition, of a masterbatch. The masterbatch comprising 75 wt.-%, based on the total weight of the masterbatch, of limestone comprising 99.3 wt.-%, based on the total weight of limestone, of calcium carbonate and 0.4 wt.-%, based on the total weight of limestone, of magnesium carbonate. The limestone had a $d_{50}$ of 3 µm and a $d_{98}$ of 12.5 µm. The masterbatch further contained 25 wt.-%, based on the total weight of the masterbatch, of a polypropylene homopolymer having a MFR of 20 g/10 min (230° C./2.16 kg) measured according to ISO 1133.

Inventive Test 7

Composition of the Sheet Produced:

73 wt.-%, based on the total weight of the composition, of polylactic acid having a MFR of 5.4 g/10 min (210° C./2.16 kg) measured according to ISO 1133 and 27 wt.-%, based on the total weight of the composition, of a masterbatch. The masterbatch comprising 65 wt.-%, based on the total weight of the masterbatch, of limestone comprising 99.3 wt.-%, based on the total weight of limestone, of calcium carbonate and 0.4 wt.-%, based on the total weight of limestone, of magnesium carbonate. The limestone had a $d_{50}$ of 3 µm and a $d_{98}$ of 12.5 µm. The masterbatch contained also 10 wt.-%, based on the total weight of the masterbatch, of talc (commercially available as Finntalc M20SL from Mondo Minerals, Finland) and 25 wt.-%, based on the total weight of the masterbatch, of a polypropylene homopolymer having a MFR of 20 g/10 min (230° C./2.16 kg) measured according to ISO 1133.

Comparative Test 8

Composition of the Sheet Produced:

75 wt.-%, based on the total weight of the composition, of polylactic acid having a MFR of 5.4 g/10 min (210° C./2.16 kg) measured according to ISO 1133 and 25 wt.-%, based on the total weight of the composition, of a masterbatch. The masterbatch comprising 78 wt.-%, based on the total weight of the masterbatch, of marble comprising 97.5 wt.-%, based on the total weight of marble, of calcium carbonate and 2 wt.-%, based on the total weight of marble, of magnesium carbonate. The marble had a $d_{50}$ of 5.5 µm and a $d_{98}$ of 30 µm. The masterbatch further contained 2 wt.-%, based on the total weight of the masterbatch, of treated chalk comprising 98 wt.-%, based on the total weight of chalk, of calcium carbonate and 0.4 wt.-%, based on the total weight of chalk, of magnesium carbonate. The treated chalk had a $d_{50}$ of 2 µm and a $d_{98}$ of 10 µm. The masterbatch further contained 20 wt.-%, based on the total weight of the masterbatch, of a linear low density polyethylene having a MFR of 20 g/10 min (190° C./2.16 kg) measured according to ISO 1133.

Inventive Test 9

Composition of the Sheet Produced:

75 wt.-%, based on the total weight of the composition, of polylactic acid having a MFR of 5.4 g/10 min (210° C./2.16 kg) measured according to ISO 1133 and 25 wt.-%, based on the total weight of the composition, of a masterbatch. The masterbatch comprising 68 wt.-%, based on the total weight of the masterbatch, of marble comprising 97.5 wt.-%, based on the total weight of marble, of calcium carbonate and 2 wt.-%, based on the total weight of marble, of magnesium carbonate. The marble had a $d_{50}$ of 5.5 µm and a $d_{98}$ of 30 µm. The masterbatch further contained 2 wt.-%, based on the total weight of masterbatch, of treated chalk comprising 98 wt.-%, based on the total weight of chalk, of calcium carbonate and 0.4 wt.-%, based on the total weight of chalk, of magnesium carbonate. The treated chalk had a $d_{50}$ of 2 µm and a $d_{98}$=10 µm. The masterbatch contained also 10 wt.-%, based on the total weight of the masterbatch, of talc (commercially available as Finntalc M20SL from Mondo Minerals, Finland) and 20 wt.-%, based on the total weight of the masterbatch, of a linear low density polyethylene having a MFR of 20 g/10 min (190° C./2.16 kg) measured according to ISO 1133.

Conditions of Sheet Extrusion:

The sheet extrusion was carried out with a Collin Cast film lab line, equipped with a single screw extruder having a diameter of 30 mm, L/d of 30, and a die length of 250 mm. No screen or filter was used before the die. The speed of the screw in the extruder was set to 50 rpm.

The setting of the extruder is outlined in Table 1:

TABLE 1

| Zone | Temperature |
| --- | --- |
| 1 | 170° C. |
| 2 | 190° C. |
| 3 | 215° C. |
| 4 | 230° C. |
| 5 | 230° C. (last zone of extruder) |
| 6 | 230° C. |
| 7 | 230° C. |
| 8 | 230° C. (die) |
| 9 | 230° C. (die) |
| 10 | 230° C. (die) |

The results of the sheet extrusion are outlined in table 2.

TABLE 2

|  | Test no1 Reference | Test no2 Comparative | Test no3 Invention | Test no4 Comparative | Test no5 Invention |
| --- | --- | --- | --- | --- | --- |
| Pressure behind the die | 32 bars | 23 bars | 32 bars | 10 bars | 21 bars |
| Material property just after extrusion (at extrusion temperature) | The material was not too liquid and could form a sheet | The material was liquid and couldn't form a sheet | The material could form a sheet | The material is liquid and couldn't form a sheet | The material was a little bit liquid and the sheet was difficult to obtain |
| Material property after extrusion and cooling (at low temperature) | The sheet is a little bit brittle | The solid polymer is brittle | The sheet is homogeneous and flexible | The solid polymer is brittle | The sheet was not very flexible |

|  | Test no 6 Comparative | Test no7 Invention | Test no8 Comparative | Test no9 Invention |
| --- | --- | --- | --- | --- |
| Pressure behind the die | 21 bars | 29 bars | 20 bars | 30 bars |
| Material property just | The material could form a | The material could form a | The material was liquid and | The material could form a |

TABLE 2-continued

| | | | | |
|---|---|---|---|---|
| after extrusion (at extrusion temperature) | sheet | sheet | couldn't form a sheet | sheet |
| Material property after extrusion and cooling (at low temperature) | The sheet was very rigid and brittle | The sheet was rigid | The solid polymer is brittle | The sheet is homogeneous and flexible |

From the data outlined in table 2, it can be gathered that each inventive test reached a higher meltpressure during extrusion in comparison to the corresponding comparative test. That is to say, the meltpressure is higher when the polymer composition comprises a combination of at least one acidic inorganic filler material and at least one alkaline inorganic filler material as inorganic filler material. Such higher meltpressure indicates that less polymer decomposition occurs during extrusion. Furthermore, it can be gathered that the extrusion conditions for the inventive tests are closer to the conditions observed for the virgin polylactic acid (Reference test 1) than the conditions observed for the comparative tests.

The invention claimed is:

1. A polymer composition comprising:
   a) from 45.0 to 94.0 wt.-%, based on the total weight of the polymer composition, of at least one biodegradable polymer resin selected from the group consisting of polylactic acid, a polylactic acid-based polymer, and a mixture thereof,
   b) from 0.1 to 20.0 wt.-%, based on the total weight of the polymer composition, of at least one polyolefin selected from a low-density polyethylene, an isotactic polypropylene having a melt flow rate MFR (230° C., 2.16 kg) measured according to ISO 1133 of from 0.5 to 100.0 g/10 min, and/or a crystallinity percentage of greater than 20%, based on the total weight of the polypropylene, or mixture thereof, and
   c) from 5.9 to 50.0 wt-%, based on the total weight of the polymer composition, of an inorganic filler material dispersed in the at least one polyolefin and the at least one biodegradable polymer resin, wherein the inorganic filler material consists of:
      i) from 10.0 to 17.5 wt.-%, based on the total weight of the inorganic filler material, of at least one acidic inorganic filler material and the at least one acidic inorganic filler material is talc, and
      ii) from 82.5 to 90.0 wt.-%, based on the total weight of the inorganic filler material, of at least one alkaline inorganic filler material comprising calcium carbonate in an amount of ≥75.0 wt.-%, based on the total weight of the at least one alkaline inorganic filler material.

2. The polymer composition according to claim 1, wherein the at least one polymer composition comprises:
   a) from 45.0 to 94.0 wt.-%, based on the total weight of the polymer composition, of the at least one biodegradable polymer resin,
   b) from 0.1 to 15.0 wt.-%, based on the total weight of the polymer composition, of the at least one polyolefin, and
   c) from 5.9 to 50.0 wt.-%, based on the total weight of the polymer composition, of the inorganic filler material dispersed in the at least one polyolefin and the at least one biodegradable polymer resin.

3. The polymer composition according to claim 1, wherein the at least one biodegradable polymer resin is a polylactic acid-based polymer.

4. The polymer composition according to claim 1, wherein the at least one biodegradable polymer resin is polylactic acid.

5. The polymer composition according to claim 1, wherein the at least one polyolefin is a low-density polyethylene.

6. The polymer composition according to claim 5, wherein the low-density polyolefin is a linear low-density polyethylene.

7. The polymer composition according to claim 1, wherein the at least one polyolefin is a linear low-density polyethylene having a melt flow rate MFR (190° C., 2.16 kg) measured according to ISO 1133 of from 0.5 to 100.0 g/10 min.

8. The polymer composition according to claim 1, wherein the at least one polyolefin is a linear low-density polyethylene having a melt flow rate MFR (190° C., 2.16 kg) measured according to ISO 1133 of from 5.0 to 90.0 g/10 min.

9. The polymer composition according to claim 1, wherein the at least one polyolefin is an isotactic polypropylene having a melt flow rate MFR (230° C., 2.16 kg) measured according to ISO 1133 of from 0.5 to 100.0 g/10 min, and/or a crystallinity percentage of greater than 20%, based on the total weight of the polypropylene.

10. The polymer composition according to claim 1, wherein the at least one polyolefin is an isotactic polypropylene having a melt flow rate MFR (230° C., 2.16 kg) measured according to ISO 1133 of from 5.0 to 90.0 g/10 min, and/or a crystallinity percentage from 30% to 90%, based on the total weight of the polypropylene.

11. The polymer composition according to claim 1, wherein the at least one polyolefin is an isotactic polypropylene having a melt flow rate MFR (230° C., 2.16 kg) measured according to ISO 1133 of from 10.0 to 80.0 g/10 min, and/or a crystallinity percentage from 45% to 85%, based on the total weight of the polypropylene.

12. The polymer composition according to claim 1, wherein the at least one acidic inorganic filler material and/or the at least one alkaline inorganic filler material has/have:
   a) a weight median particle size $d_{50}$ value in the range from 1.0 μm to 12.0 μm, and/or
   b) a specific surface area (BET) of from 0.1 to 15.0 m²/g as measured by the BET nitrogen method.

13. The polymer composition according to claim 1, wherein the at least one alkaline inorganic filler material is selected from ground calcium carbonate (GCC) and/or precipitated calcium carbonate (PCC).

14. The polymer composition according to claim 1, wherein the at least one alkaline inorganic filler material is ground calcium carbonate (GCC) selected from the group consisting of marble, chalk, dolomite, limestone, and any mixture thereof and/or at least one precipitated calcium carbonate (PCC) selected from one or more of the aragonitic, vateritic and calcitic mineralogical crystal forms.

15. The polymer composition according to claim 1, wherein the at least one alkaline inorganic filler material comprises calcium carbonate in an amount ≥90.0 wt.-%, based on the total weight of the at least one alkaline inorganic filler material.

16. The polymer composition according to claim 1, wherein the at least one alkaline inorganic filler material comprises calcium carbonate in an amount ≥95.0 wt.-%, based on the total weight of the at least one alkaline inorganic filler material.

17. The polymer composition according to claim 1, wherein the at least one alkaline inorganic filler material comprises calcium carbonate in an amount from 97.0 to 99.9 wt.-%, based on the total weight of the at least one alkaline inorganic filler material.

18. The polymer composition according to claim 1, wherein at least 1% of the accessible surface area of the at least one acidic inorganic filler material and/or the at least one alkaline inorganic filler material is covered by a coating comprising:
    a) at least one aliphatic carboxylic acid having a total amount of carbon atoms from C4 to C24 and/or reaction products thereof, and/or
    b) at least one mono-substituted succinic anhydride consisting of succinic anhydride mono- substituted with a group selected from a linear, branched, aliphatic and cyclic group having a total amount of carbon atoms from C2 to C30 in the substituent and/or reaction products thereof, and/or
    c) a phosphoric acid ester blend of one or more phosphoric acid mono-ester and/or reaction products thereof and one or more phosphoric acid di-ester and/or reaction products thereof.

19. The polymer composition according to claim 1, wherein at least 1% of the accessible surface area of the at least one acidic inorganic filler material and/or the at least one alkaline inorganic filler material is covered by a coating comprising stearic acid and/or reaction products thereof.

20. The polymer composition according to claim 1, further comprising at least one additive selected from the group consisting of impact modifiers, lubricants, waxes, stabilizers, processing aids, pigments, coloring agents, and any mixture thereof.

21. An article comprising the polymer composition according to claim 1.

22. The article according to claim 21, which is a packaging article, a food packaging, a bottle, a container, a cup, or a food tray.

23. The article according to claim 21, wherein the article is prepared by an extrusion process, a co-extrusion process, a blown film extrusion process, a cast film extrusion, a sheet extrusion process, an extrusion coating process, an injection molding process, a blow molding process, or a thermoforming process.

24. A process for preparation of a polymer composition according to claim 1, the process comprises the steps of:
    a) providing at least one biodegradable polymer resin selected from the group consisting of polylactic acid, polylactic acid-based polymer, and a mixture thereof, in an amount of from 45.0 to 94.0 wt.-%, based on the total weight of the polymer composition,
    b) providing at least one polyolefin selected from a low-density polyethylene, an isotactic polypropylene having a melt flow rate MFR (230° C., 2.16 kg) measured according to ISO 1133 of from 0.5 to 100.0 g/10 min, and/or a crystallinity percentage of greater than 20%, based on the total weight of the polypropylene, or mixture thereof, in an amount from 0.1 to 20.0 wt.-%, based on the total weight of the polymer composition,
    c) providing from 10.0 to 17.5 wt.-%, based on the total weight of an inorganic filler material, of at least one acidic inorganic filler material and the at least one acidic inorganic filler material is talc,
    d) providing from 82.5 to 90.0 wt.-%, based on the total weight of the inorganic filler material, of at least one alkaline inorganic filler material comprising calcium carbonate in an amount of ≥75.0 wt.-%, based on the total weight of the at least one alkaline inorganic filler material, wherein the inorganic filler material is from 5.9 to 50.0 wt-%, based on the total weight of the polymer composition and the inorganic filler material consists of the at least one acidic inorganic filler material and the at least one alkaline inorganic filler material, and
    e) combining the components of step a), step b), step c) and step d) in any order such that a polymer composition is formed and the inorganic filler material is dispersed in the at least one polyolefin and the at least one biodegradable polymer resin.

25. A polymer composition comprising:
    a) from 45.0 to 94.0 wt.-%, based on the total weight of the polymer composition, of at least one biodegradable polymer resin,
    b) from 0.1 to 15.0 wt.-%, based on the total weight of the polymer composition, of at least one polyolefin selected from a low-density polyethylene, an isotactic polypropylene having a melt flow rate MFR (230° C., 2.16 kg) measured according to ISO 1133 of from 0.5 to 100.0 g/10 min, and/or a crystallinity percentage of greater than 20%, based on the total weight of the polypropylene, or mixture thereof, and
    c) from 5.9 to 50.0 wt.-%, based on the total weight of the polymer composition, of an inorganic filler material dispersed in the at least one polyolefin and the at least one biodegradable polymer resin, wherein the inorganic filler material consists of:
        i) from 10.0 to 17.5 wt.-%, based on the total weight of the inorganic filler material, of at least one acidic inorganic filler material is talc, and
        ii) from 82.5 to 90.0 wt.-%, based on the total weight of the inorganic filler material, of at least one alkaline inorganic filler material comprising calcium carbonate.

26. The polymer composition according to claim 25, wherein the at least one biodegradable polymer resin is selected from the group consisting of polylactic acid, polylactic acid-based polymer, aliphatic polyester, polyhydroxybutyrate, poly-3-hydroxybutyrate (P3HB), polyhydroxyvalerate, polyhydroxybutyrate-polyhydroxyvalerate copolymer, poly(3-hydroxybutyrate-co-3-hydroxyvalerate), polyglyconate, poly(dioxanone), and any mixture thereof.

27. The polymer composition according to claim 25, wherein the at least one biodegradable polymer resin is selected from the group consisting of polylactic acid, polylactic acid-based polymer, and a mixture thereof.

* * * * *